(12) United States Patent
Stafford et al.

(10) Patent No.: US 7,640,409 B1
(45) Date of Patent: Dec. 29, 2009

(54) METHOD AND APPARATUS FOR DATA MIGRATION AND FAILOVER

(75) Inventors: Anthony Arthur Stafford, Sandhurst (GB); Norman Allen Abramovitz, Cupertino, CA (US); Thomas Egan, Sunnyvale, CA (US); Jenlong Wang, Los Altos, CA (US); Cheng-Mu Wen, San Jose, CA (US); Juntse Chen, Milpitas, CA (US); Thomas Rex Bosworth, Jacksonville, FL (US); Steven Bundy Wahl, Arvada, CO (US); Bradley David Musolff, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 11/193,166

(22) Filed: Jul. 29, 2005

(51) Int. Cl.
*G06F 12/00* (2006.01)
(52) U.S. Cl. .................... 711/162; 711/165; 707/202
(58) Field of Classification Search ............... 711/162, 711/165; 707/202
See application file for complete search history.

(56) References Cited

U.S. PATENT DOCUMENTS

| 6,145,066 | A | 11/2000 | Atkin | |
| 6,820,098 | B1* | 11/2004 | Ganesh et al. | 707/202 |
| 6,845,428 | B1* | 1/2005 | Kedem | 711/117 |
| 7,340,571 | B2* | 3/2008 | Saze | 711/154 |

* cited by examiner

*Primary Examiner*—Christian P Chace
*Assistant Examiner*—Hashem Farrokh
(74) *Attorney, Agent, or Firm*—Douglas Lashmit; Hoffman Warnick LLC

(57) ABSTRACT

Method and apparatus for data migration are described herein. In one embodiment, in response to data received from an application to be written to a first storage volume, the data is written to the first storage volume and a second storage volume substantially concurrently. When the first and second storage volumes are synchronized, a switchover is performed from the first storage volume to the second storage volume, such that subsequent data received from the application is written to the second storage volume, where writing the data to the first and second storage volumes and the switchover are performed without knowledge of the application. Other methods and apparatuses are also described.

29 Claims, 15 Drawing Sheets

METHOD AND APPARATUS FOR DATA MIGRATION AND FAILOVER

FIELD OF THE INVENTION

The present invention relates generally to a data processing system. More particularly, this invention relates to data migration of a data processing system.

BACKGROUND

Various storage hardware vendors have introduced features on their disk arrays to allow the movement of storage volumes both within a single array and between arrays. These features were mostly designed as high availability features and not targeted as data migration features. In addition many operating system (OS) vendors have developed mirroring software which allowed synchronous writes to a secondary volume. Again these were designed with high availability in mind, rather than data migration.

Recently, a standard set of tools has been provided by storage and operating system vendors and other software developers to allow data to be automatically copied, archived, and restored. Although some progresses have been made, a problem still exists in that the availability capabilities of these facilities have not kept pace with the availability requirements that exist in data centers. A storage administrator has to support the increasing demands of continuous 24 hour by 7 day data availability.

There is an explosive growth in the need to store and have on-demand access to greater and greater pools of data. As capacity requirements skyrocket, data availability demands increase. These factors coupled with the need to control costs dictate that new storage technology be implemented. The dilemma faced by data center management is that the implementation of new storage technology is disruptive and therefore conflicts with the need to maximize availability of the data. Therefore, an additional tool is required that will allow data to be non-disruptively relocated or migrated within the data center.

Typically, a data migration facility provides the ability to "relocate" data from one device to another device. A logical relationship is defined between a device (e.g., the source) and another device (e.g., the target). The logical relationship between a source and target volume provides a framework for a data migration. The data migration facility controls multiple concurrent migrations. A migration is a process that causes the data on the source volume to be copied without changing to the target volume.

Migration facilities that exist today were primarily designed for disaster recovery or the facilities were meant to address single volume failures. Many volume managers today allow mirrors of logical volumes to be created on a server. The actual method and commands to create mirrors varies by a volume manager. Continuous read and write accesses by applications are allowed during the data migration process and all data updates are reflected to the secondary volume. Logical volume mirrors were designed for high availability and although they can be used to migrate volumes from one control unit to another, they are not optimized for data migration purposes.

Recently, some vendors have introduced array based mirroring techniques. However, such techniques have been designed for proprietary systems. A user has to install a specific tool from the specific vendor in order to utilize such a system. Thus, the products that are available on the market today do not meet all of the data migration requirements.

SUMMARY OF THE DESCRIPTION

Method and apparatus for data migration are described herein. In one embodiment, in response to data received from an application to be written to a first storage volume, the data is written to the first storage volume and a second storage volume substantially concurrently. When the first and second storage volumes are synchronized, a switchover is performed from the first storage volume to the second storage volume, such that subsequent data received from the application is written to the second storage volume, where writing the data to the first and second storage volumes and the switchover are performed without knowledge of the application.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Method and apparatus for data migration are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Embodiments of the invention include a data migration facility for managing and maintaining computer systems and particularly for automatic movement of relatively large amounts of data (e.g., migration of data) from one data storage location (e.g., a source) to another data storage location (e.g., a target), locally or remotely. In one embodiment, a computer system includes multiple storage volumes for storing data used in the computer system, one or more storage control units for controlling I/O transfers of data in the computer system from and to the storage volumes. One or more application programs executed in the computer system utilize data accessed from and to the storage volumes. One or more operating system programs may be executed in the computer system for controlling the storage volumes, the storage control units and the application programs. A data migration program may be used for migrating data from one of the data volumes designated as a source volume to one or more of other data volumes designated a target volume, while the application programs are executing using data accessed from and to the storage volumes.

Note that for the purposes of illustration, throughout this application, UNIX is used as an example of an operating system. It will be appreciated that the techniques described herein may also be applied to other operating systems such as those set forth above. Embodiments of the invention include a data migration facility for managing and maintaining computer systems and particularly for automatic movement of relatively large amounts of data (e.g., migration of data) from one data storage location to another data storage location, locally or remotely.

Figure 1A:
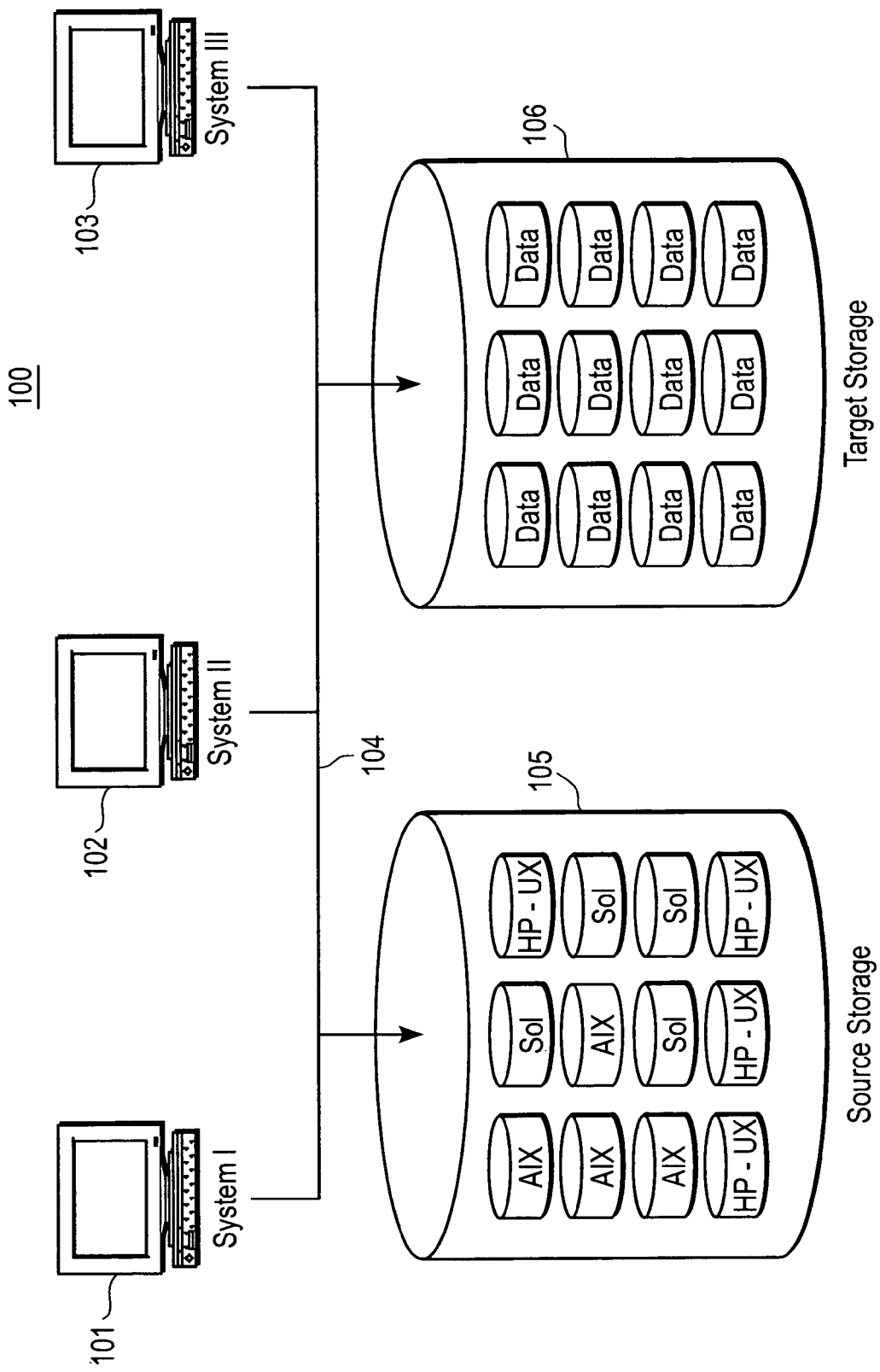
FIGS. 1A and 1B are block diagrams illustrating a computer system which may be used with certain embodiments of the invention.

FIG. 1A shows a block diagram illustrating a system, which may be used with an embodiment of the invention. Referring to FIG. 1A, an example of system configuration 100 includes, but is not limited to, one or more data processing systems 101-103 running with a variety of operating systems such as those set forth above. For example, systems 101-103 may be implemented as servers (e.g., Web servers) or individual workstations. An operating system is configured to control the operations of a corresponding data processing system and to control an application program executed therein. An operating system may include a volume manager (not shown) to manage one or more storage volumes (e.g., logical and/or physical volumes) and one or more device drivers which manage the IO (input/output) operations.

In addition, system configuration 100 further includes at least one source storage array/device 105 with one or more volumes therein. Each of the data processing systems 101-103 may utilize one or more of the volumes within device 105. The system configuration 100 may further include at least one target storage array/device 106, which may or may not have a similar configuration as device 105. Devices 105 and 106 may be coupled any one of the data processing systems 101-103 via communication mechanism 104, which may be a bus, an interconnect, and/or a network. For example, systems 101-103 may be Web servers providing 24/7 services to customers over the Internet while storages 105-106 may be coupled to any one of the servers 101-103 via a backbone network. Other configurations may exist.

In one embodiment, a volume manager (not shown) on each operating system defines the number and size of each of the logical volumes associated with the corresponding operating system. The target device 106 may be physically installed and defined by a volume manager of each data processing system. In one embodiment, a target volume is in general inactive and has no file system mounted.

According to one embodiment, data from the source storage array 105 may be migrated to the target array 106. In one embodiment, systems 101-103 may be available for normal operations while the migration is taking place. Both the source and target storage devices 105-106 may appear to an operating system as if they were connected "locally" to the corresponding system. This could however include iSCSI or SAN attached devices which are remote from the actual system.

In one embodiment, a data migration facility, also referred to as TDMF (transparent data migration facility), is designed to be flexible. It is independent of the type, model, or manufacturer of the physical storage devices/arrays (e.g., devices 105-106) or how they are attached to the server (e.g., iSCSI, SAN, or DAS). TDMF can support logical and/or physical volumes of any size and can support multiple concurrent migrations.

In addition, according to certain embodiments, TDMF is designed to have a relatively simple installation, a configuration assistant utility, a command set that returns consistent output that can be used in scripts and consistent operation across a variety of operating systems, and a mechanism to determine the status of the migration. Further, TDMF is designed to have minimal impact on a production application in a variety of operations. It uses minimal system resources and can be regulated to accommodate high production activity, or even quiesced for periods of time and restarted from where it left off. Furthermore, TDMF is designed to have a relatively high or a complete degree of data integrity, including dynamic error detection, passive and non-destructive IO monitoring, audit capability and blocking to prevent incorrect operation.

Figure 1B:
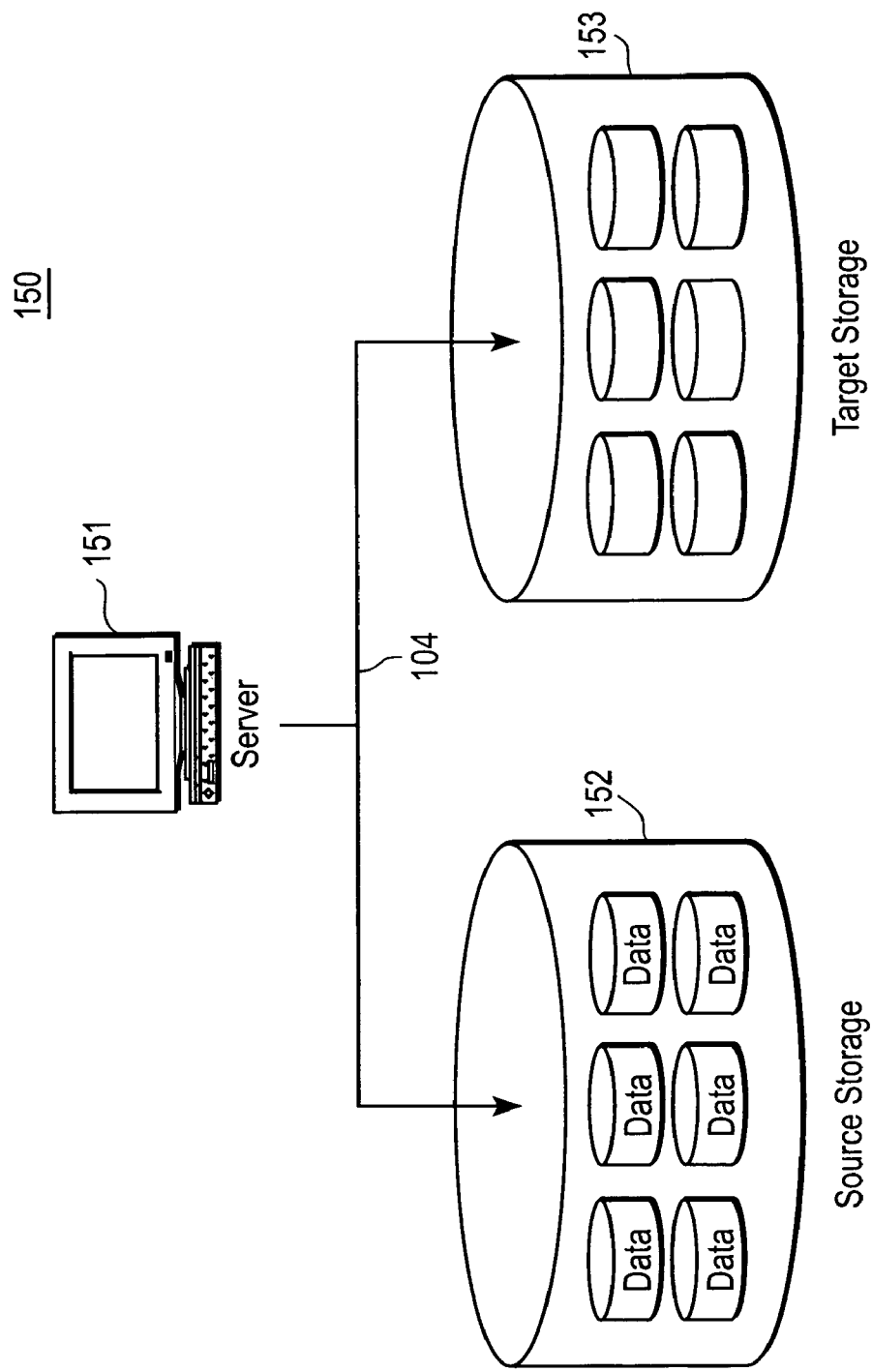

FIG. 1B is a simplified version of the system shown in FIG. 1A according to certain embodiments of the invention. In this embodiment, a UNIX server 150 running an AIX operating system with a JFS file system and an AIX LVM (logical volume manager) (not shown). In this particular embodiment, the AIX LVM has defined six logical volumes that reside on an IBM FastT storage array 152.

A data migration operation is configured to migrate six logical volumes to an EMC Clariion array 153 that is also attached to the same server 151, locally or remotely. This migration may take place while the AIX server 151 continues to run normal production application that is accessing and updating data on the IBM FastT storage array 152. The AIX LVM has also defined six identically sized logical volumes on the EMC Clariion device 153. Other components may also be included.

Figure 2:
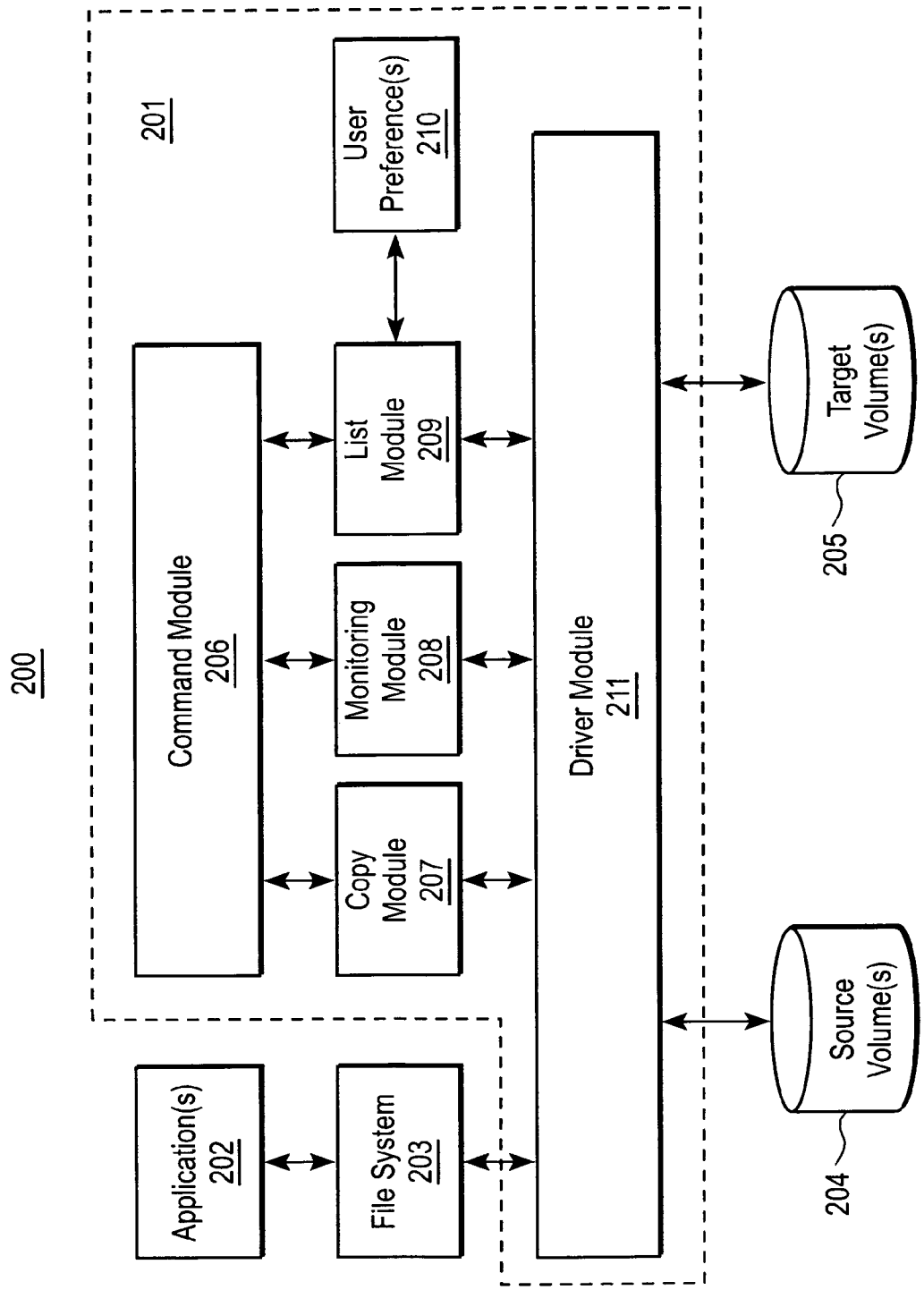
FIG. 2 is a block diagram illustrating an architecture of a data migration facility according to one embodiment of the invention.

FIG. 2 is a block diagram illustrating data migration architecture according to one embodiment of the invention. In one embodiment, architecture 200 includes, but is not limited to, a date migration program 201, one or more applications 202 communicatively coupled to storage volumes 204-205 via an optional file system 203. In one embodiment, a data migration program 201 includes a command module 206 to control a start of a migration session when the one or more application programs 202 are using data accessed to and from the source volume 204.

The command module 206 may be used to migrate data from a source volume 204 to a target volume 205, and the command module 206 may be used to end the migration session, where the application programs 202 are using data accessed to and from the target volume 205. The data migration program 201 further includes a driver module 211 to control the volumes 204-205 during the migration process. The data migration program 201 further includes a copy module 207 to control copying of data from the source module 204 to the target module 205 during the migration process. The data migration program 201 further includes a monitor module 208 for monitoring I/O transfers to the data volumes during the migration sessions.

Note that the data migration may be performed within a kernel space of an operating system (OS) of a data processing system accessing the source and target storage volumes 204-205. As a result, the data migration may be performed without knowledge of the applications 202. The data migration may be performed while the applications 202 are accessing at least one of the source and target storage volumes 204-205 substantially concurrently. It will be appreciated the data migration may be performed within a combination of an application level (e.g., user level) and a kernel level of the operating system.

In one embodiment, the copy module 207 has the ability to adjust a copying rate with which the migration is performed in view of a size of data blocks copied in each copying operation, and a number of concurrent volumes that may be active in migration at any point in time. In one embodiment, the above parameters may be specified via a copy command, which will be described in detail further below. In one embodiment, the copy operations may be performed without knowledge of an application, while the application is accessing at least one of the source and target storage devices.

This feature allows for relatively high numbers of volumes to be migrated with little or no user intervention while still limiting any impact on the system. This allows the interference to an application to be managed as well as the rate of the migration. In one embodiment, the copy operation may be suspended or halted at any time due to a variety of reasons and is able to resume from where it left off. For example, this includes a situation where the server is shutdown and restarted. In a further embodiment, the copy module 207 also has the ability to launch an automatic switchover as each source volume is synchronized with an associated target volume. This enables a rapid and automatic switchover to the new devices with no user intervention other than the initialization of the copy command.

In one embodiment, a list module 209 may be utilized to provide a common interface across all supported platforms (e.g., different operating systems), where a user can develop a common portable methodology and scripts regardless of the host operating system. According to one embodiment, the list module 209 allows for a common command to be issued that lists substantially all eligible source volumes and eligible target volumes, and filters out in accordance with a user preference 210 those volumes that should be excluded and/or included. As a result, the process of storage migration may be simplified by providing a simple and common interface regardless of the operating systems, volume managers, file systems, and/or storage hardware devices being used.

In one embodiment, a driver module 211 allows for the creation of a virtual volume that enables the migration facility on active source volumes. A virtual volume provides the interface from which a target device or volume can be dynamically attached. A virtual volume may be further configured to initiate a copy operation to synchronize the source and target, to initiate a switchover operation, and to remove the original volumes (e.g., the original source storage volume) thereafter with minimum or no disruption to the application service.

Note that the above operations may be performed with minimum or without knowledge of an application service. For example, when an application is accessing data of a storage volume, from a view point of the application, it is accessing a storage volume represented by the virtual storage volume without knowing that there are one or more source and/or target storage volumes encapsulated by the virtual storage volume. In a particular embodiment, there is one source and one or more target storage volumes. When the command module 206 initiates a start of data migration, the copy module 207 may initiate a copy operation to copy at least a portion of content of source storage volume 204 (also referred to a first storage volume) to target storage volume 205 (also referred to a second storage volume) for the purposes of synchronization. Meanwhile, one or more applications 202 may be accessing at least one of the source and target storage volumes 204-205 via file system 203 (e.g., read and/or write requests). In response, the driver module 211 may intercept (via virtual volume presented by the driver module 211) such requests and redirect these requests to the source and/or target storage volumes, while the copying operations are substantially concurrently performed via the copy module 207. Since most of the above operations are performed within a kernel space of the operating system, the applications 202 may not know the existence of the source and target storage volumes 204-205. In some cases, when the copying operations are performed, the applications 202 may receive a returned status (e.g., a pending status) indicating that the access requests are being performed by an underlying driver (e.g., disk driver) in the kernel. As a result, the threads of the applications 202 would not be held up and the applications 202 can perform other tasks (e.g., in the user level) while the access requests are queued up in the kernel space. Other configurations may exist.

In one embodiment, the data migration program 201 may be dynamically activated and terminated, including a non-disruptive automatic swap operation (also referred to as a switchover operation) that may not require operator intervention. The data migration operations may be performed transparently to applications and/or end-users while providing complete read and write activities to storage volumes during the data migration. In one embodiment, multiple substantially concurrent migrations may be performed per copy process permitting multiple concurrent copy operations. Once the initial installation of the data migration program is completed including a remount of the file system, data migration can be performed non-disruptively, for example, without requiring reboot of an operating system. The data migration program may be performed independent of vendors with any-to-any device migration and independent of storage control unit (e.g., model type or device type, etc.). The data migration program 201 further includes a database that stores configuration and statistical information, etc.

In one embodiment, the data migration facility 201 provides a fallback option should any problems exist after the switchover. The data migration facility has a complete data integrity at all or most of time with the ability to introduce new storage subsystems with minimal or no disruption of service and to allow a variety of communication mechanisms, such as, for example, SCSI (small computer system interface), iSCSI (Internet SCSI), DAS (Direct Attached Storage), and/or SAN (storage area network) connections, to ensure vendor independence. In one embodiment, the data migration program or facility 201 may be implemented mostly as computer software without a need for dependency on hardware, firmware, and/or microcode assist. However, it is not so limited. A combination of software and hardware may be implemented.

In one embodiment, the data migration facility provides or accesses a database facility that stores current configuration data, which may be implemented locally or remotely. The database further maintains statistics on current operations, such as, for example, a copy rate, an estimated completion time, an amount copied, an amount to be copied, and/or a previous successful block copied, etc. The contents of both the configuration portion and the statistics may be viewed at any time through a status command, for example, via a CLI (command line interface) or other interfaces (e.g., a Web interface, etc.)

In one embodiment, the data migration facility 201 provides an interface across a variety of operating systems, such as UNIX, Linux, Mac OS, Windows, or other operating systems (e.g., embedded or real-time operating systems). In one embodiment, the interface includes a set of operational commands to initiate and control the migration, to query devices attached to the system, to obtain version and status information, and to query and set license keys. A valid license key enables the create, add and copy commands. The license key may be generated to restrict the use of TDMF to s specific server, by time (with an expiry date) or by an amount of storage to be migrated on a specific server (in 100 GB increments).

The data migration facility 201 further provides a utility (not shown) to manage one or more operating system automount tables (e.g., a file system table) in a manner independent of a type of the OS and to manipulate migration configuration groups for operating convenience. The automount tables may be used by the operating system to mount and/or unmount certain storage volumes, such as, for example, a virtual storage volume and one or more of source and target storage volumes, etc.

Figure 3:
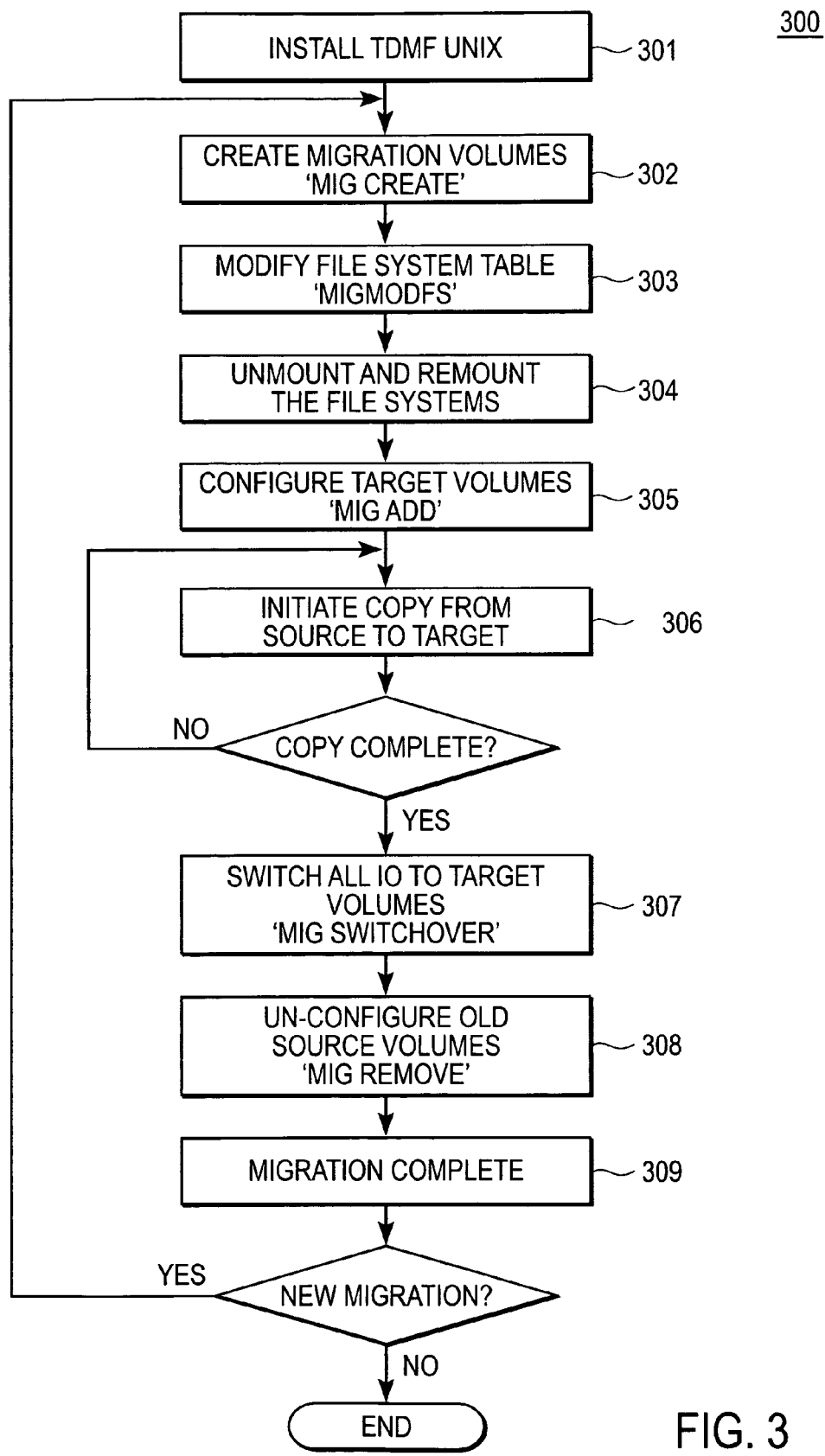
FIG. 3 is a flow diagram illustrating a migration process according to one embodiment of the invention.

FIG. 3 is a flow diagram illustrating an example of a process for data migration according to one embodiment. Process 300 may be performed by processing logic that may comprise hardware (e.g., circuitry, dedicated logic, etc.), software (such as is run on a general-purpose computer system, a server, a router, or a dedicated machine), or a combination of both. For example, process 300 may be performed by system 200 of FIG. 2. Referring to FIG. 3, at block 301, TDMF can be installed on any supported operating system while the production application is active. The installation uses a standard install operation for the specific operating environment.

For example, referring to FIGS. 2 and 3, for given specific operating system, the installation may install a proper interface (via a list module 209 of FIG. 2), such as, proper driver module 211, for that operating system. As a result, an application (e.g., applications 202 of FIG. 2) may access via file system 203 to a standardized interface provided by the driver module to access at least one of the source and target storage volumes 204-205. In addition, an administrator (via an administrative application) may launch a data migration operation (via command module 206) through a common interface which handled by the driver module 211 in a variety of different operating systems. Other configurations may exist.

Referring back to FIG. 3, at block 302, one or more migration volumes are created and associated with a specific underlying source volume. The one or more migration volumes may be created using a migration creation command such as a "mig create" command. This can also be done while the application is active. In one embodiment, a migration creation command may be implemented as follows:

mig create [-g<group_tag>| -a] [-n]<migration_volume> <source_volume>[<target_volume> . . . ]

where a "group tag" may optionally be specified such that a selection of migration volumes may be managed together according to certain embodiments of the invention. There is no special semantic associated with the group tag other than a way of simplifying command usage. Having a group tag associated with a selection of volumes does also not preclude issuing commands to a specific (or a selection) of migration volumes regardless of the group tag. In one embodiment, a "-a" option indicates that the copy operation will affect all eligible migration volumes. The -n option is to indicate that the migration volumes should not be re-created at system boot time. This is helpful if TDMF is implemented and managed in a cluster environment.

In one embodiment, each time the command is executed, it creates a migration device that is associated with a source volume, and optionally one or more associated target volumes. For example, the following sequence of commands may be used to create 3 migration volumes on a Unix system with LVM (logical volume manager):

mig create -g mgroup1 migvol1/dev/vg00/lvol1
mig create -g mgroup1 migvol2/dev/vg00/lvol2
mig create -g mgroup1 migvol3/dev/vg00/lvol3 where the newly created migration volume may have a pre-determined (and optionally configurable) path name, such as, for example:

/dev/mig/<migration volume name> but is referred to in all commands simple by a migration volume name.

At block 303, before TDMF can be activated, a file system may be modified (e.g., change any symbolic links) such that the file system refers to the migration volume path (e.g., /dev/mig/<migration volume) rather than the original source device. In addition, according to one embodiment, the file system table may be modified such that the file system may automatically be mounted on the new migration volumes (e.g., virtual volumes) at boot time, or if an unspecific mount command is issued. This may be done through a migration modification command, such as a "migmodfs" command. Such a command may be executed just prior to or after the file system is unmounted from the original source device. This operation may be a one-time operation and subsequent migrations may not require this operation.

In one embodiment, a migration modification command may be implemented as follows:

migmodfs -m | -s [-pb] -g<group_tag>| -a where
-m Converts the /etc/fstab file from the original source volume mountpoints to the equivalent migration volumes
-s Converts the /etc/fstab file from the migration volume mountpoints back to their current source volumes (to be used after a migration copy and switchover)
-p Make changes without prompts—used when the command is used in scripts
-b Clean up backup copies of the file system table (TDMF maintains up to 10 backup copies of the file system table)
-g <group tag> changes mount points for all migration volumes in the specified group
-a <all> changes mount points for all defined migration volumes For example with the above "mgroup1" set of migration volumes, running the following script:

migmodfs -m -g mgroup1 may make the following changes to a file system table (e.g., /etc/fstab):

| # TDMF modification | | | | | |
|---|---|---|---|---|---|
| #/dev/vg00/lvol1 | /mount1 | hfs | defaults | 0 | 2 |
| /dev/mig/migvol1 | /mount1 | hfs | defaults | 0 | 2 |

-continued

```
# TDMF modification

#/dev/vg00/lvol2    /mount2   hfs   defaults   0   2
/dev/mig/migvol2    /mount2   hfs   defaults   0   2
# TDMF modification

#/dev/vg00/lvol3    /mount3   hfs   defaults   0   2
/dev/mig/migvol3    /mount3   hfs   defaults   0   2
```

Note that the format or formats for the command(s) throughout this application are shown for the illustration purposes only. It will be appreciated that other format or formats may be implemented. Referring back to FIG. 3, once the migration volumes are created and the file system table is changed, at block 304, the file system may be unmounted from the original source devices and re-mounted on the new migration devices (e.g., virtual storage volumes). In one embodiment, no reboot is required. When this is done, the application may be re-started and normal operation may be resumed.

At block 305, the target devices are associated with each migration volume. This may done with a migration addition command, such as, for example, a "mig add" command, and can be performed while the system is active and application systems are accessing the source devices. In one embodiment, a migration addition command may be defined as follows:

mig add <migration_volume> <target_volume>[<target_volume> . . . ]

For example, as illustrated below, one target volume is added to the each migration volume in the series of commands:

mig add migvol1/dev/vg01/lvol1
mig add migvol2/dev/vg01/lvol2
mig add migvol3/dev/vg01/lvol3

When a target is added to a migration volume, according to one embodiment, the TDMF driver may start doing synchronous writes to both the source and target devices.

At block 306, when a target has been added, it is being written to but has not yet been synchronized with the source device. To do this, a migration copy command, such as a "mig copy" command may be issued for synchronization purposes. This can be issued at the individual migration volume, a list of migration volumes, and/or a group of some or all defined migration volumes. In one embodiment, a command to initiate the copy may be defined as follows:

mig copy [-f] [-x] [-s<100th's_secs>] [-b<blocksizeKB>] [-t<num_of_threads>]\-a |
-g<group_tag>|<migration_volume_name>[<migration_volume_name] . . . ]

Where:
-f (force) option forces a copy to start at the beginning for all target volumes.
-x (switchover) option performs an automatic switchover upon completion of the copy operations, re-designating the first target volumes as the new source volumes for each migration volume.
-s (sleep) option throttles the copy operation by ensuring that a minimum amount of time elapses between each copy I/O to each target volume. [Default of 10 (100th's of a second)]
-b (blocksize) option sets the size of the buffer for each copy operation. [Default of 256 KBytes]
-t (threads) option sets the number of concurrent threads performing the copy operation in parallel for the migration volumes indicated.

The migration volumes are specified for this operation by:
-a (all) All migration volumes defined for the system.
-g<group_tag>" (group) All migration volumes in a group
-one or more individual migration volume names.

In another embodiment, the migration copy command may be defined as follows:

mig copy -x -s 0 -t 4 -b 512 -g mgroup1

In this embodiment, substantially all migrations volumes (source volumes) in group "mgroup1" (namely migvol1, migvol2, and migvol3) may be copied to their respective target volumes as defined in the "mig add" command.

In addition, a zero sleep time may be specified so that the copy operation may occur at a full speed. Although -t 4 is specified (e.g., four threads), according to one embodiment, only three threads may actually start because there are only three migration volumes in the group. All three copy operations may start substantially simultaneously. A block size of 512 Kbytes is used for each I/O copy operation.

In one embodiment, a copy operation may record the previous block of data successfully copied from the source to the target. If it is interrupted at any point, it can be restarted from where it left off. It can also be restarted with new performance characteristics (e.g., -x, -s, -t or -b values as set forth above). If these performance characteristics need to be changed, any active copy operation may be interrupted deliberately and re-started with different performance values.

Once the copy operation has completed and the target volumes are in synchronization with the source volumes (e.g., in a state of UPTODATE), a switchover can take place. At this point, according to one embodiment, all writes from the application are written synchronously to both the source and target devices, but all reads may be satisfied from the source device. Other target device states may include at least one of the following:

SCRATCH—target exists but not synchronized with source
COPYING—a copy operation is in progress against this target
UPTODATE—target is synchronized with source
SOURCE ONLY—no target exists
MIXED—more than one target exists and they are in different states Referring back to FIG. 3, at block 307, once the copy operation has completed, a migration switchover command, such as, for example, a "mig switchover" command may be issued to initiate a switchover. According to certain embodiments, one of the options on the migration copy command (e.g., a "mig copy" command) may be used to automatically perform the switchover as soon as it completes a volume copy.

According to one embodiment, a migration switchover may reverse the roles of the migration volume source volume and the specified target volume. For example, an original source storage volume of a previous migration operation (e.g., prior to the current switchover) may become a new target storage volume and an original target storage volume may become a new source storage volume. In one embodiment, a migration switchover command may be defined as follows:

mig switchover -a | -g<group_tag>|<migration_volume_name>\[<new_source_volume_path>]   [<migration_volume_name>\[<new_source_volume_path>] . . . ]

If no target volume (e.g., new_source_volume_path) is specified in the command, according to one embodiment, the first target volume defined for the migration storage volume is automatically selected as a new source storage volume for a next data migration. A warning may be returned should the specified target volume not be in an UPTODATE state and/or the switchover is not performed for that migration volume In many storage migration situations, a single target volume is specified on each migration volume. To simplify the switchover process to the new storage, a "-a" (all) and "-g" (group) option may be provided that defaults to switching the source to the first target, such as, for example, mig switchover -g mgroup1

After the migration switchover, according to one embodiment, the roles of the source and target may be reversed. In such a situation, all write requests still go to both the 'new source' (e.g., old target) and the 'old source' (e.g., new target). However, all reads are performed from the new source device (e.g., the old target). If the migration switchover command were issued a second time with identical parameters, according to one embodiment, the configuration would be back to where it was before any migration switchover command had been issued. This is useful in the event of performance or other problems with the new devices to provide a fallback mechanism after switching to the new devices. In one embodiment, the fallback operation may return the configuration to the situation prior to the initial switchover. For example, the source volume(s) will be the original source volume(s) and the targets of all source volumes will still be in UPTODATE state. In one embodiment, if the target volumes need to be re-configured to correct the problem, it will be required to remove the targets, correct the problem with the target devices, and add them back and redo the copy operation.

Referring back to FIG. 3, at block 308, once the new devices are performing as expected, the original source devices may be removed from the configuration using a migration remove command, such as, for example, a "mig remove" command. For example, the following command may remove one or more targets from a migration volume:

mig remove -a| -g<group_tag>|<migration_volume_name>[<target_volume_path>[<target_volume_path> . . . ]]

If either the "-a" (all) or "-g<group_tag>" options or a migration volume name is provided with no target volume path, the first added target volume for each migration volume included is removed.

In the following examples, according to certain embodiments of the invention, one target volume is removed from a migration volume in one or more of following commands:

mig remove migvol1/dev/vg01/lvol1
mig remove migvol2/dev/vg01/lvol2
mig remove migvol3/dev/vg01/lvol3

When these commands are issued, TDMF may cease doing synchronous writes to the target volumes. If the target volumes are in an UPTODATE state then a PIT (Point in Time Copy) may be created, otherwise the volume that is removed will be in an unknown state. For example, if a target is removed when it is in SCRATCH or COPYING state it will only have partial data on it and will not be a valid device to be used by any application. The original source devices are now no longer used and may physically be removed from the configuration according to certain embodiments of the invention. This allows the storage array to be fully de-commissioned.

At this stage the configuration is exactly as it was at operation 305. The file system is still mounted on the migration device (also referred to as a virtual volume or virtual device) and there is a single source device. In order to migrate one or more of these devices to a new location, operations involved in blocks 305 through 308 may be repeated. No application outage is required for any subsequent migration.

Referring back to FIG. 3, at block 309, in order to fully remove TDMF from the system a migration delete command, such as a "mig delete" command, may be utilized. This command may delete the migration device and may be done after the file system has been unmounted from the migration device. In addition, according to one embodiment, the file system automount table may be changed, for example, using a "migmodfs" command, so that the file system may automatically be mounted on the underlying source device (e.g., an actual device) rather than the migration device (e.g., a virtual device). This can also be achieved using a migration commands as follows:

mig delete -a | -g<group_tag>|<migration volume_name>\ [<migration_volume_name> . . . ]

where
"-a" (all) Deletes all migration volumes for the system.
"-g<group_tag>" (group) Deletes all migration volumes belonging to the group
migmodfs -s -a | -g<group_tag>|<migration_volume_name>

[migration_volume_name> . . . ]

where
"-a" (all) changes the file system table for all defined migration volumes.
"-g<group_tag>" (group) changes the file system table for all migration volumes belonging to the group
"-s" Indicates that the file system table should be changed so that the file systems will be mounted on the defined underlying source device (rather than the migration device)

The above command may delete one or more migration volumes. This operation does not affect the underlying source or target volumes, or their data content, but removes them from the migration volume and destroys the migration volume construct or one or more individual migration volumes names. As a result, subsequent operations from an application will be directly preformed on the source and/or target volume without going through the migration volume (e.g., virtual volume).

At any time during the migration process, according to one embodiment, the status of the migration and target volumes may be examined using a migration status command, such as, for example, a "mig status" command, which may be defined as follows according to one embodiment:

mig status [-l] -a| -g<group_tag>|<migration_volume_name>\[<migration_volume_name> . . . ]

where
-l option will report status for each source and target volume encapsulated by the migration volumes as well.
-a option will report status for all migration volumes defined for the host system.
-g <group_tag> will report status for all migration volumes sharing the provided group tag string. If no options are provided, and "-a" option is assumed.

Otherwise, status is reported for the migration volumes provided to this command, which may be issued locally or remotely over a network. According to one embodiment, the output from this command reports the status of the specified migration volumes including, but is not limited to, the following:

- state (e.g., SOURCE ONLY, SCRATCH, COPYING, UPTODATE, MIXED)
- percent copy complete
- estimated time for copy completion
- bytes copied
- bytes remaining An example of output from a "mig status" command may be similar to the following according to certain embodiments:

| Migration Volume Status: | 1 migration volumes |
|---|---|
| Migration Volume: | migvol0 |
| Size: | 100 MB |
| Mount point: | /mnt |
| State: | COPYING |
| Complete: | 31% |
| Elapsed Time: | 00:00:17 |
| Time Remaining: | 00:00:36 |
| Component Volumes: | |
| /dev/vg0/lvol0 | 100 MB SOURCE |
| /dev/vg1/lvol0 | 100 MB COPYING |
| Total Size: | 100 MB |
| Estimated Time Remaining: | 00:00:36 |
| Copy Rate: | 2253 KB/sec |

In this example, there is a source volume (e.g., /dev/vg0/lvol0) being migrated to a target volume (e.g., /dev/vg1/lvol0), where the migration volume path is /dev/mig/migvol0. The copy operation is in progress and has been running for approximately 17 seconds and expects to be completed in approximately 36 seconds. Both source and target volumes are 100 MB and the copy rate is approximately 2253 KByte/second. Other information may also be included.

Figure 4:
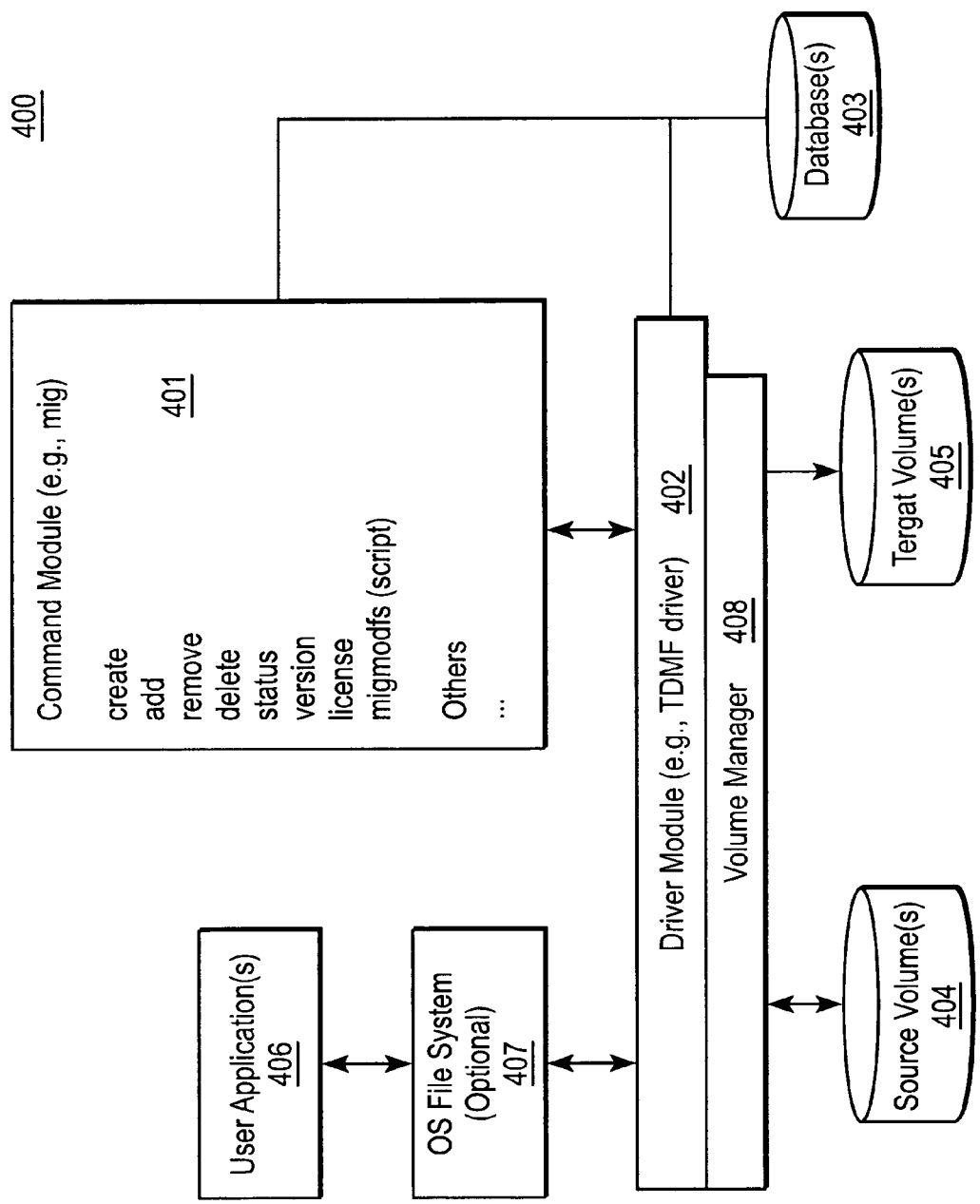
FIG. 4 is a block diagram illustrating software components used to perform a migration process according to one embodiment of the invention.

FIG. 4 is a block diagram illustrating a TDMF system according to one embodiment of the invention. Referring to FIG. 4, system 400 includes, but is not limited to, a command module 401, a TDMF driver 402, and a database 403. In one embodiment, command module 401 may be used to encapsulate the functions of some or all of the command line commands including, but are not limited to, the migration commands set forth above.

In one embodiment, TDFM device driver 402 may be used to manage most or all of IO (input/output) operations and statistics gathering for the migration. Database 403 may be used to store configuration information and current statistical operations with regard to the migration. Database 403 may be implemented locally or remotely and it may include one or more databases, physically or logically. In one embodiment, a migration status command (e.g., a "mig status" command) may report the configuration and current status of the migration from database 403 to an application or applications 406 via a file system 407 of an operating system (e.g., Unix operating system), as described above.

According to one embodiment, command module 401 communicates to the driver 402 and volume manager 408 via IOCTL (input/output control) commands to access volumes 404 and 405, which may be implemented locally or remotely with respect to command module 401. Both the driver 402 and the command module 401 (using any of the configuration commands as set forth above) update database 403 regarding a current configuration and status of the migration. Other components may also be included.

Figure 5:
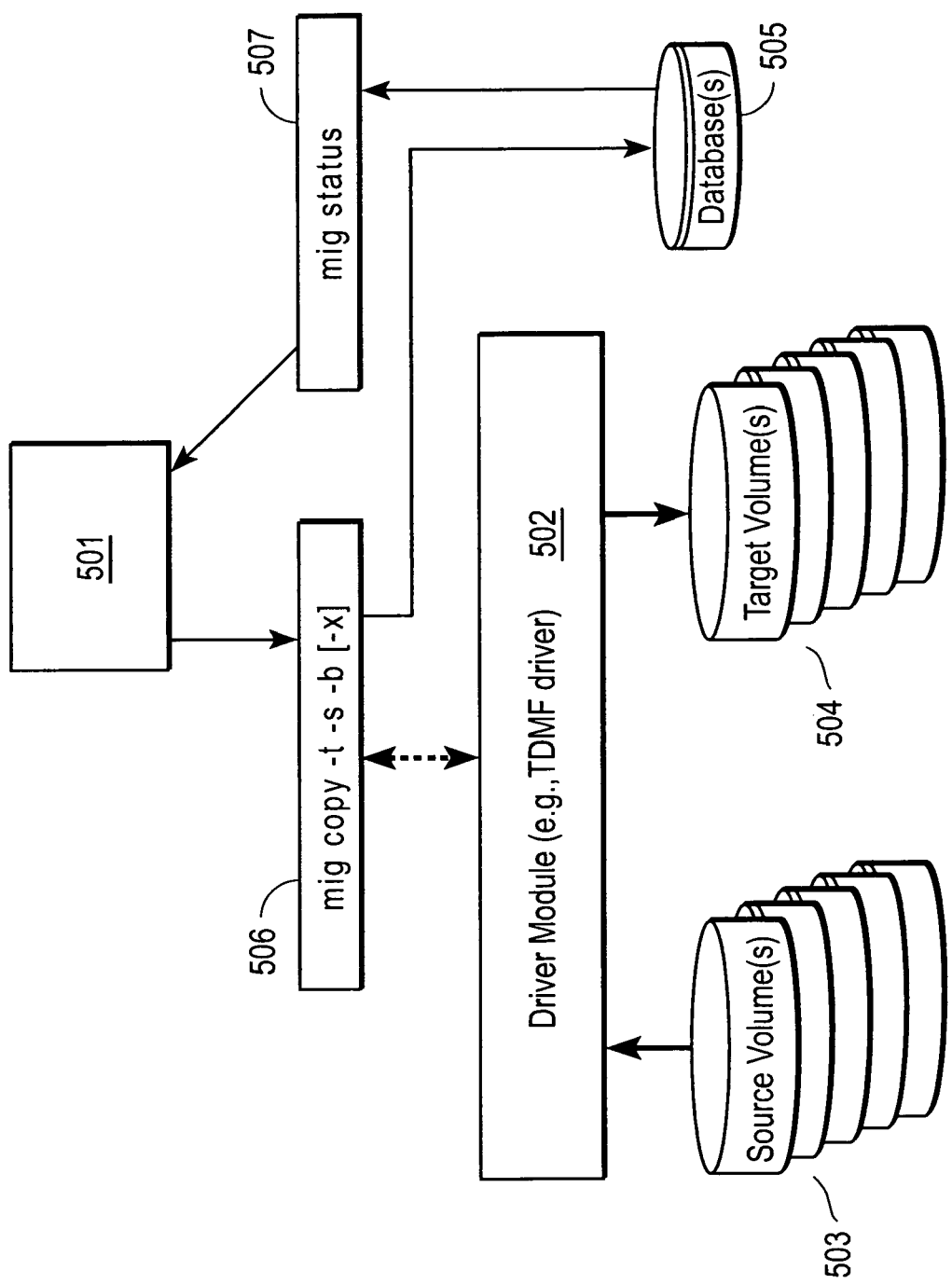
FIG. 5 is a block diagram illustrating a copy command component in a migration process according to one embodiment of the invention.

FIG. 5 is a block diagram illustrating a process of a data migration according one embodiment of the invention. In this embodiment, a migration copy command is illustrated. In this embodiment, the migration is initiated by issuing a migration copy command 506 (e.g., mig copy command) with scope to act on one or more migration volumes represented by TDMF driver 502. It can be issued on a migration volume that has a target (e.g., volume 504) already associated with the migration volume. The migration copy command 506 may be issued from system 501, which may be coupled locally or remotely.

During a migration copy operation, according to one embodiment, if the command is issued on a migration volume, all of whose target volumes are already in an UPTODATE state (e.g., a synchronized stated), a minimum or no migration activity may be involved. In one embodiment, a "-f" (e.g., force) option may be used to force a copy of all data from a source volume 503 to a target volume 504 starting at the beginning. If the migration copy command 506 detects that it had already been partially active against an eligible migration volume (e.g., based on information from database 505), according to one embodiment, the migration copy operation may resume from where is had previously been interrupted unless the "-f" option is specified.

In one embodiment, a single copy command may be used to trigger multiple data migration operations on multiple migration volumes, where each migration volume may be associated with a source and one or more target volumes. If the migration copy command 506 may affect multiple migration volumes, according to one embodiment, a "-t" option may be used to determine how many concurrent copy operations are permitted to be active at any one time. For example, if there are 100 migration volumes and the "-t" option specifies 6, only 6 concurrent copies may be initiated. As each finishes, a new one may be initiated until all 100 migration operations have been completed.

A "-s" option may be specified in 1/100ths of a second as the minimum sleep time between each atomic copy operation from the source to the target device according to certain embodiments. Increasing this value allows more time for the production service to perform other tasks, such as its IO operations. However, it may also slow down the migration. A value of zero for "-s" option may mean that the migration copy operation may proceed at a maximum rate, but may slow down the application accessing the storage volume or volumes.

A "-b" option may be used to specify a size in Kbyte for each copy operation according to one embodiment. The copy operation of migrating a block of data from a source device 503 to a target device 504 is a blocking operation that may block other applications from accessing the source and/or target devices. During such an operation, no other IO operations may be allowed to access source device 503 until the copy operation of that block of data has completed. In one embodiment, application IO operations (e.g., IOCTLs) may be queued until the copy operation completes to ensure complete data integrity on the target device 504.

In one embodiment, an optional "-x" option on the copy command may be used to do an automatic switchover when the copy operation completes for each volume. Thus in the example above with 100 volumes and a concurrency value (-t) of 6, when all 100 copy operations have completed they will automatically become the new source volumes.

Figure 6:
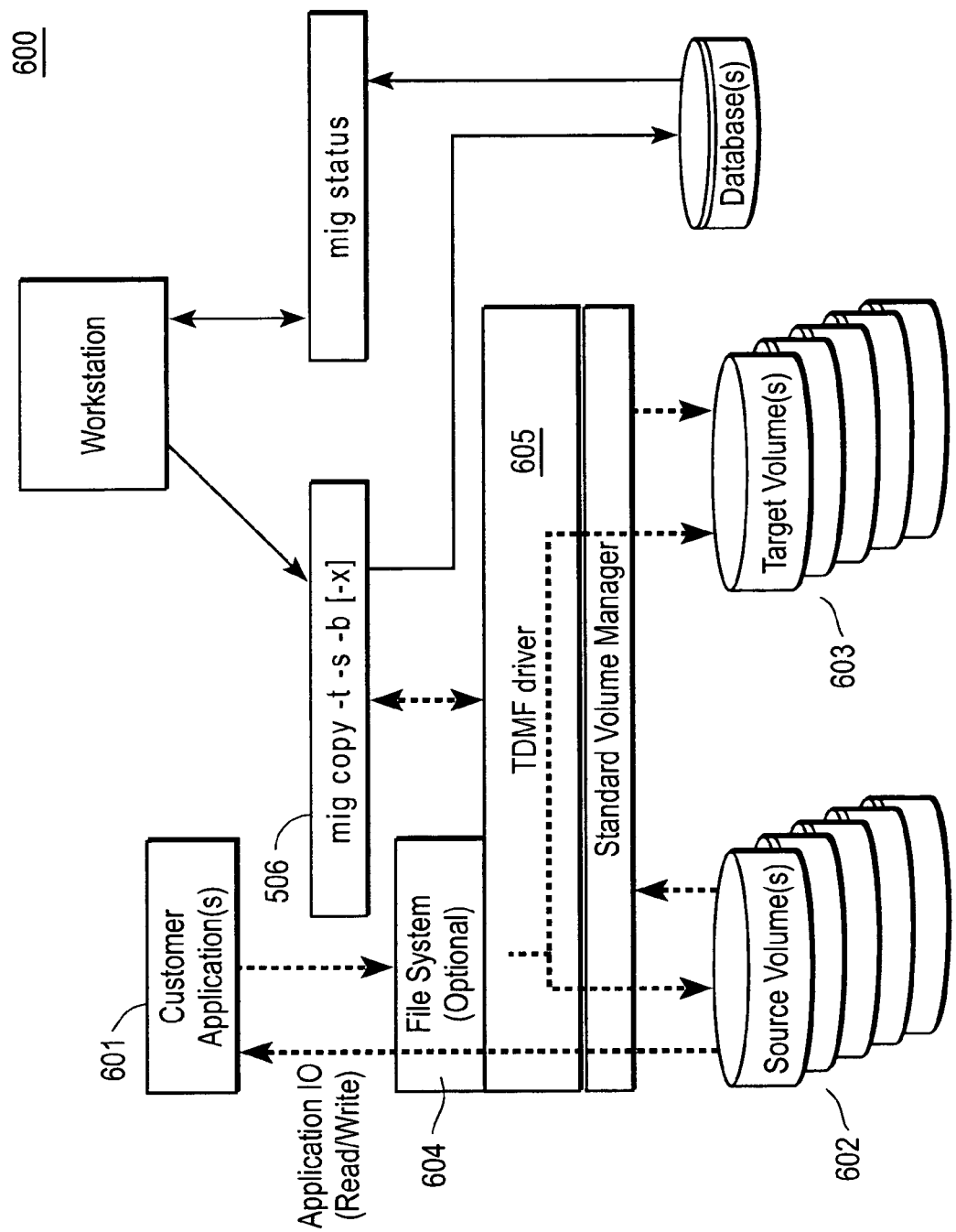
FIG. 6 is a block diagram illustrating I/O request components during a migration process according to one embodiment of the invention.

FIG. 6 is a block diagram illustrating operations during a data migration according to one embodiment of the invention. Referring to FIG. 6, in this embodiment, it is assumed that there is an active production application 601 accessing the source volumes 602 while a migration is taking place to target volumes 603. According to one embodiment, there are at least two types of operations, application read and write operations.

During an application read operation (simply referred to as a read operation), according to one embodiment, an application issues a read for a block of data that is resident on a source disk. The application 601 issues a read to a file system 604 and the file system 604 will request the data from the device it is mounted on, in this case a migration device (e.g., /dev/mig/migvolxx). A TDMF driver 605 recognizes this request as a read request and may pass the IO request directly to the mapped source device 602. The read is satisfied without any interference from the TDMF driver 605. When the underlying device (e.g., device 602) returns the data (or an error) this is reflected directly back to the file system 604.

During an application write operation (simply referred to as a write operation), according to one embodiment, an application 601 issues a write to a block of data aimed at a source device 602. When application 601 issues the write to the file system 604 this will usually (unless otherwise specified) buffer the data for a short period (e.g., cached). At some point, the file system 604 will write the data to the disk it is mounted on (e.g., the migration device). The migration device (which may be implemented as an instance of the TDMF driver 605) may accept the IO and substantially simultaneously write the data to both the source 602 and target devices 603. The TDMF driver 605 may monitor the IO requests and only when the block of data has been successfully written to both the source 602 and target device 603, the IO may be returned as complete back to the file system 604.

According to certain embodiments of the invention, if any error is returned on the source device 602, the error may be signaled back to the file system. If an error is reported back from the target disk 602 (but not the source), the target disk 603 is placed in a SCRATCH state and IOs are stopped to that device. In one embodiment, a SCRATCH state indicates that the target device can not be considered a valid copy of the source device and is not synchronized with the source device. The target device will go from UPTODATE state (synchronized with source) to SCRATCH if an error occurs on the target, or if it is in COPYING state, copying will cease to that device and it will transition to SCRATCH state. The source device is unaffected.

According to one embodiment, the TDMF driver 605 checks whether a block copy operation is in progress on the source volume 602 that will be affected by the write request (e.g., at least a portion of the location of the storage being copied overlaps with the location being written by the write request). If so, the write request may be queued until the block copy is completed. In one embodiment, the "-s" and/or "-b" options on the copy command may be used to determine an amount of time that the write request will be affected by the copy operation. Other configurations may exist.

Figure 7:
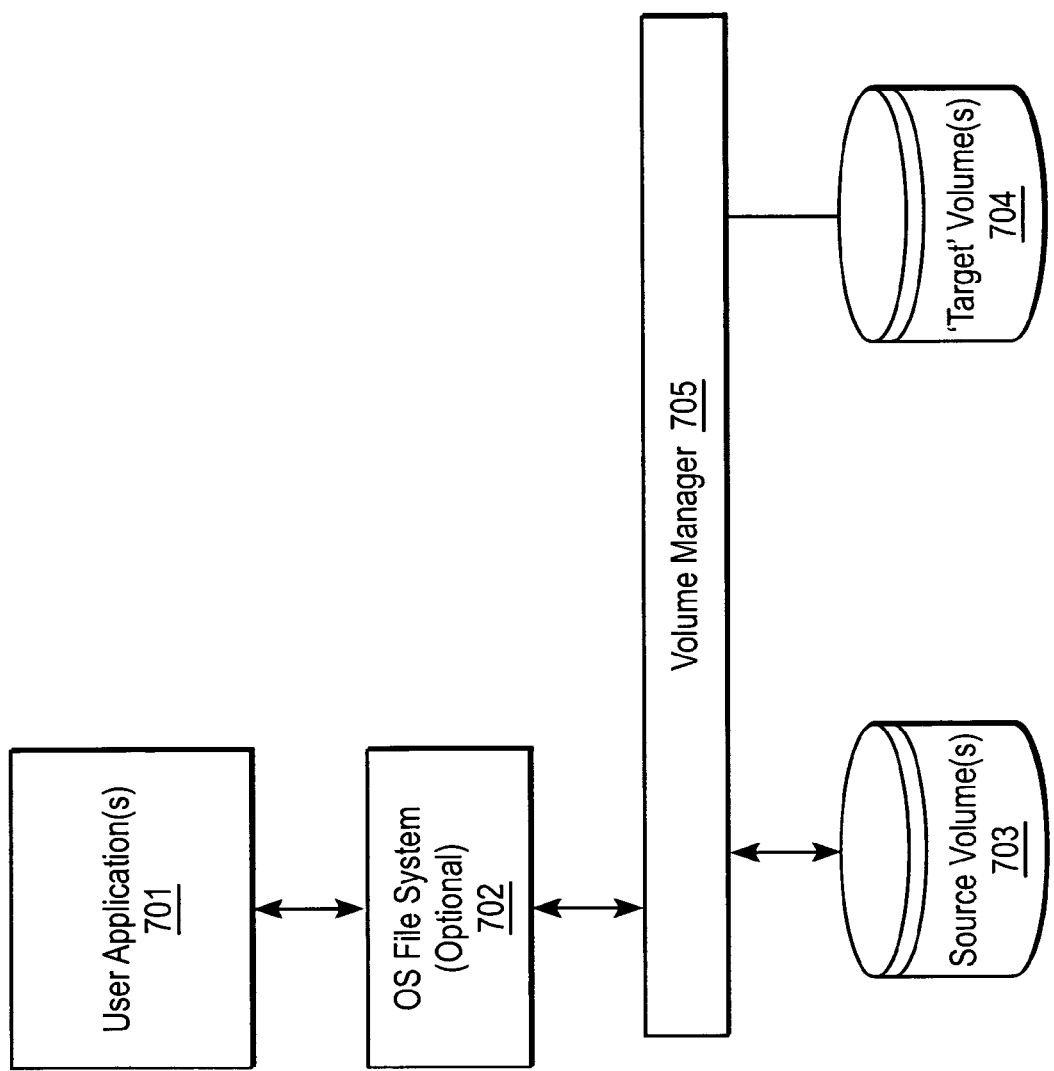
FIGS. 7-13 are block diagrams illustrating certain stages of a data migration operation according to one embodiment of the invention.

FIGS. 7-13 are block diagrams illustrating a data migration operation according to one embodiment of the invention. Referring to FIG. 7, in this embodiment, prior to TDMF installation, an application 701 is using an OS file system 702 and the file system 702 is mounted on the source device 703 as presented by the OS volume manager 705. In preparing the data migration, according to one embodiment, a new device (e.g., a target device) 704 is installed and is defined by the volume manager 705, for example, using one or more techniques set forth above. The volume manager 705 therefore recognizes both the source 703 and target 704 devices.

Figure 8:
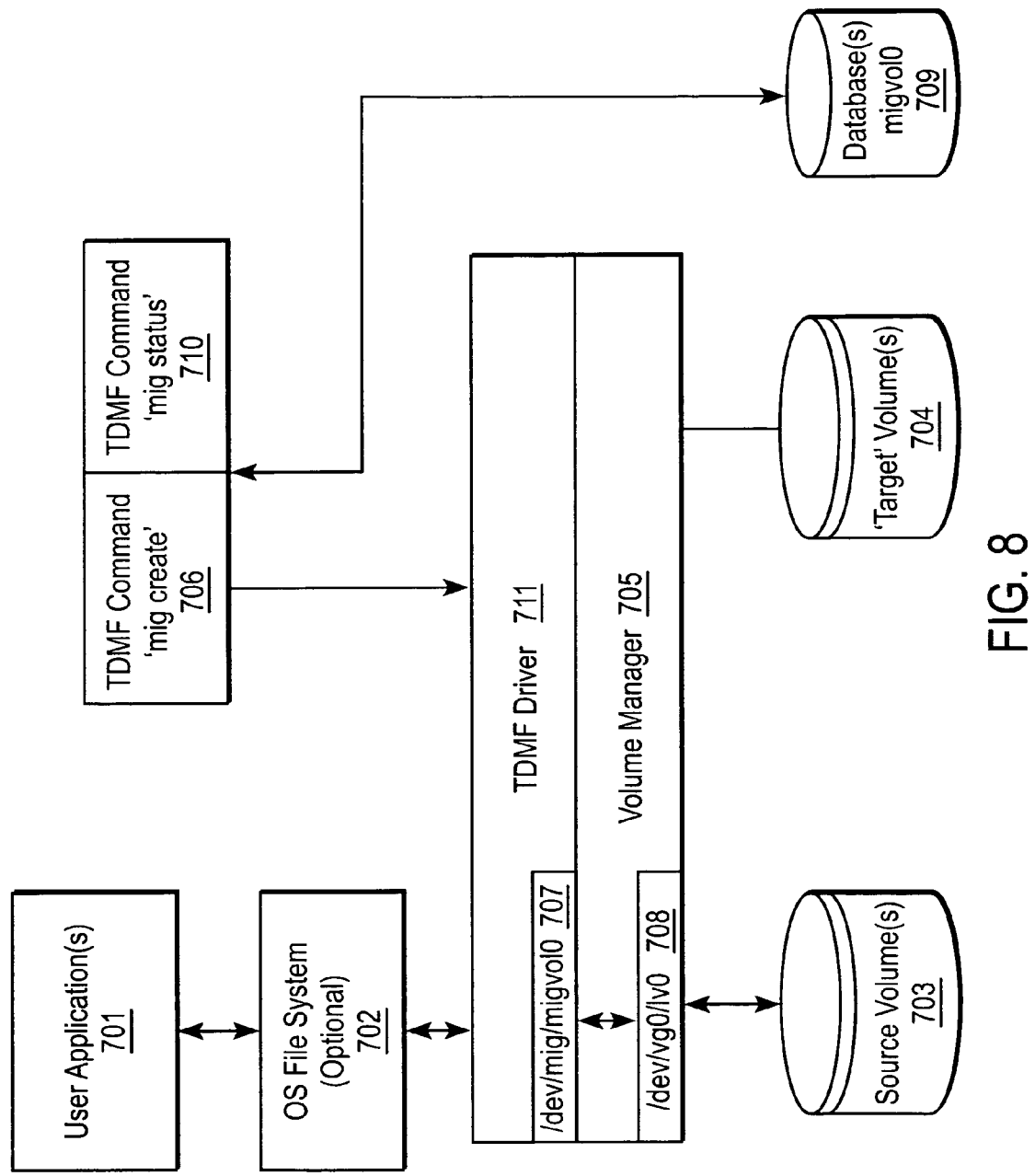

Referring to FIG. 8, in this embodiment, TDMF has been installed and a migration create command 706 (e.g., a "mig create" command) has been issued, for example, using one or more techniques set forth above. The OS file system 702 (e.g., a file system table) has been changed such that the file system is mounted on the migration device 707 (e.g., /dev/mig/migvol0 or a vital volume) which was created by the migration create command 706. This in turn maps directly to the 'real' source device 708 (e.g., /dev/vg/0/lv0) that represents source volume(s) 703. This configuration has been saved in the TDMF database 709.

According to one embodiment, a migration status command 710 (e.g., a "mig status" command) may be used to display the configuration in the database 709, for example, using one or more techniques set forth above. In a particular embodiment, a status report may be implemented similar to the following:

| | |
|---|---|
| Migration Volume Status: | 1 migration volumes |
| Migration Volume: | migvol0 |
| Size: | 100 MB |
| Mount point: | /mnt |
| State: | SOURCE-ONLY |
| Component Volumes: | |
| /dev/vg0/lv0 | 100 MB SOURCE |
| Total Size: | 100 MByte |
| Estimated Time Remaining: | 00:00:00 |

In this embodiment, application and file system 10 requests (both read and write) are passed transparently through the TDMF driver 711 to the underlying logical or physical volume 703/704. The state of the migration volume is "SOURCE ONLY".

Figure 9:
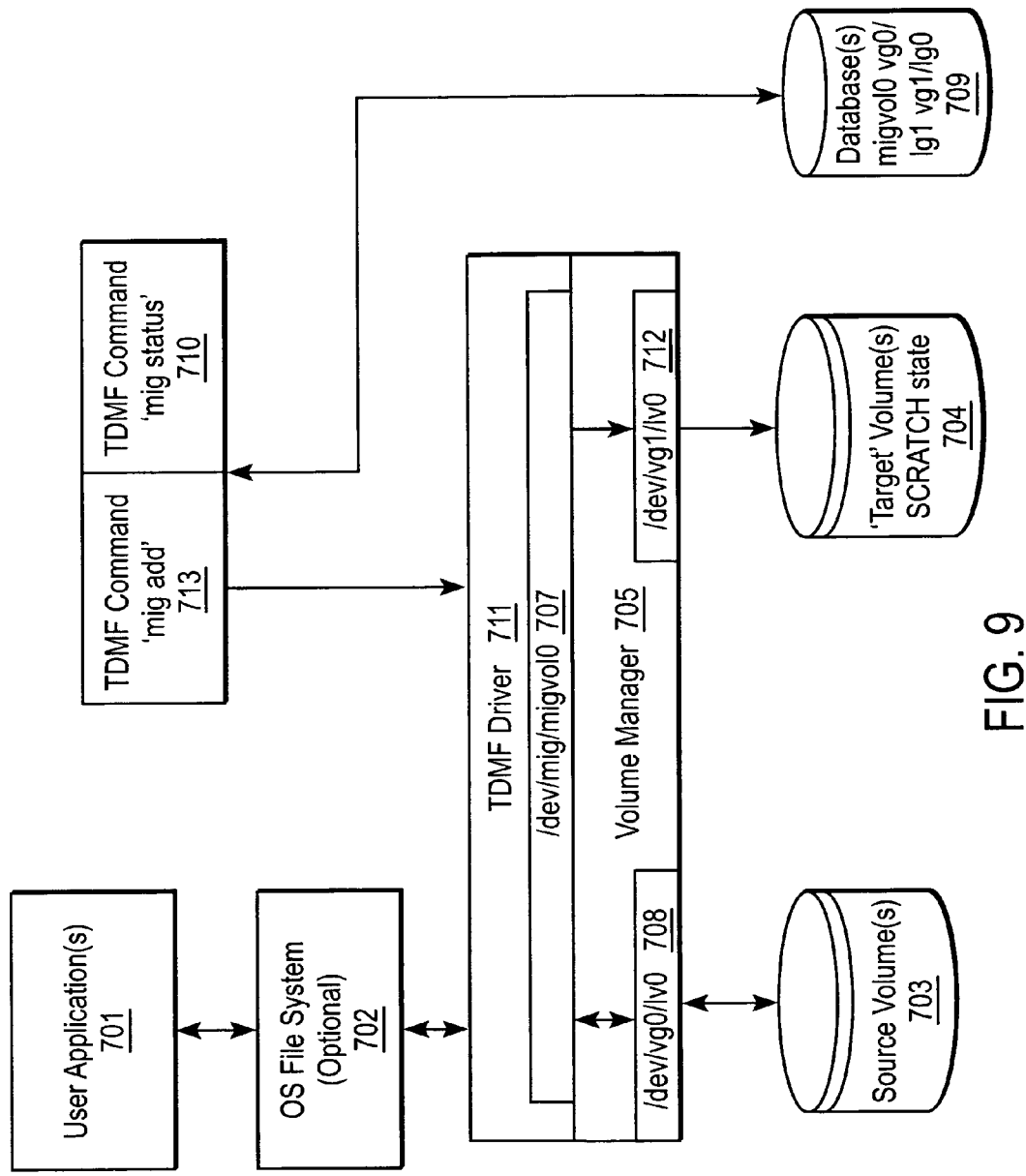

Referring now to FIG. 9, this diagram shows a single target device 712, which represents target volume(s) 704 having been added to the single migration volume 707 using a migration addition command 713. According to one embodiment, the migration volume 707 may split the IO and synchronously write the data of the IO to both the source 703 and target 704 logical volumes.

According to one embodiment, the configuration may be saved in the migration database and can be displayed with a migration status command set forth above, which may be similar to the following:

| | |
|---|---|
| Migration Volume Status: | 1 migration volumes |
| Migration Volume: | migvol0 |
| Size: | 100 MB |
| Mount point: | /mnt |
| State: | SCRATCH |
| Component Volumes: | |
| /dev/vg0/lv0 | 100 MB SOURCE |
| /dev/vg1/lv0 | 100 MB SCRATCH |
| Total Size: | 100 MByte |

The state of the target volume 704 is in a SCRATCH state, which indicates that it has not yet been synchronized with the source volume 703.

Figure 10:
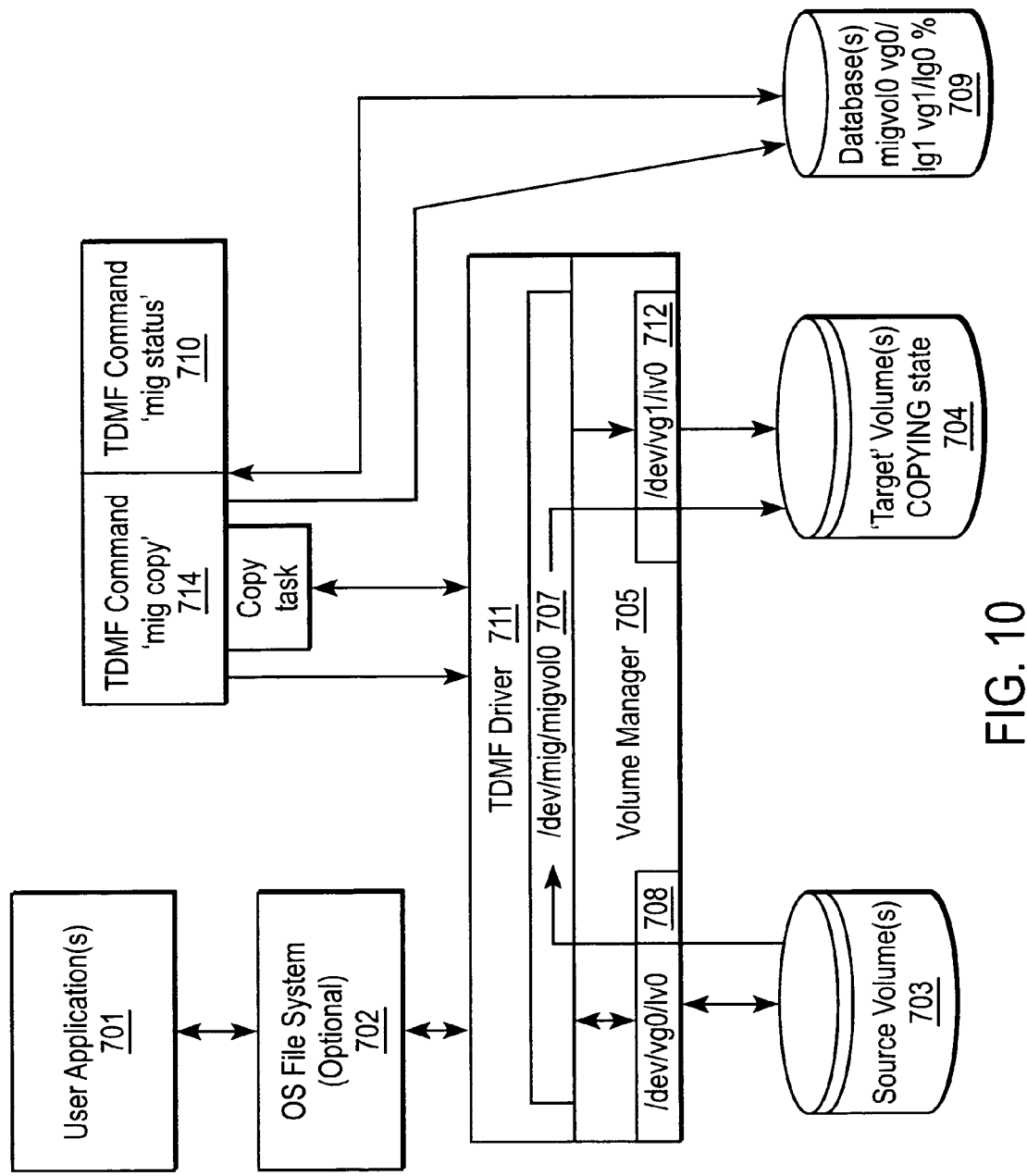

Referring now to FIG. 10, in this diagram a copy migration is in progress. In this embodiment, application read and write operations are performed from a source volume 703 and all writes operations are performed to both source 703 and target 704 volumes. Specifically, a copy operation is in progress migrating data from the source volume 703 to the target 704 volume. The copy command 714 may monitor progress and save the configuration and/status data in a database 709, such as, for example, the previous block successfully copied and/or an average copy rate.

A migration status command 710 (e.g., a "mig status" command) may be able to use the data in the database 709 to estimate the progress of the copy and the anticipated completion time, similar to the following information:

| Migration Volume Status: | 1 migration volumes |
|---|---|
| Migration Volume: | migvol0 |
| Size: | 100 MB |
| Mount point: | /mnt |
| State: | COPYING |
| Complete: | 31% |
| Elapsed Time: | 00:00:17 |
| Time Remaining: | 00:00:36 |
| Component Volumes: | |
| /dev/vg0/lv0 | 100 MB SOURCE |
| /dev/vg1/lv0 | 100 MB COPYING |
| Total Size: | 100 MB |
| Estimated Time Remaining: | 00:00:36 |
| Copy Rate: | 2253 KB/sec |

Where the target volume is in a COPYING state.

Figure 11:
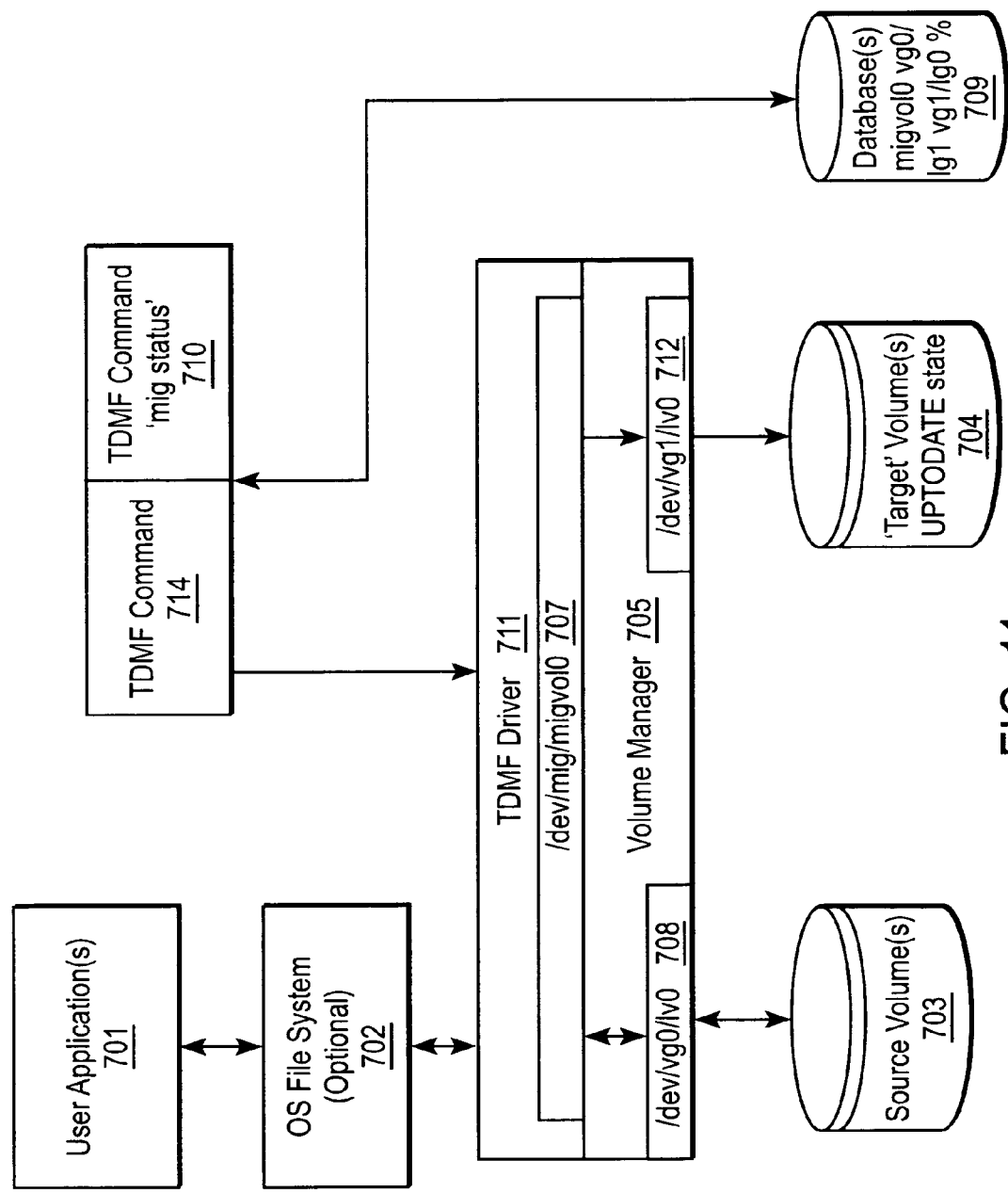

Referring now to FIG. 11, this diagram shows the status after the copy operation has completed. In this embodiment, the source 703 and target 704 are in synchronization. Substantially all application operations are performed from the source volume 703 and all write operations are going to both the source 703 and target 704 volumes. In one embodiment, the target volume is in an UPTODATE status and is eligible for a switchover. This status may be stored in the TDMF database 709 similar to the following configuration:

| Migration Volume Status: | 1 migration volumes |
|---|---|
| Migration Volume: | migvol0 |
| Size: | 100 MB |
| Mount point: | /mnt |
| State: | UPTODATE |
| Component Volumes: | |
| /dev/vg0/lv0 | 100 MB SOURCE |
| /dev/vg1/lv0 | 100 MB UPTODATE |
| Total Size: | 100 MB |

Figure 12:
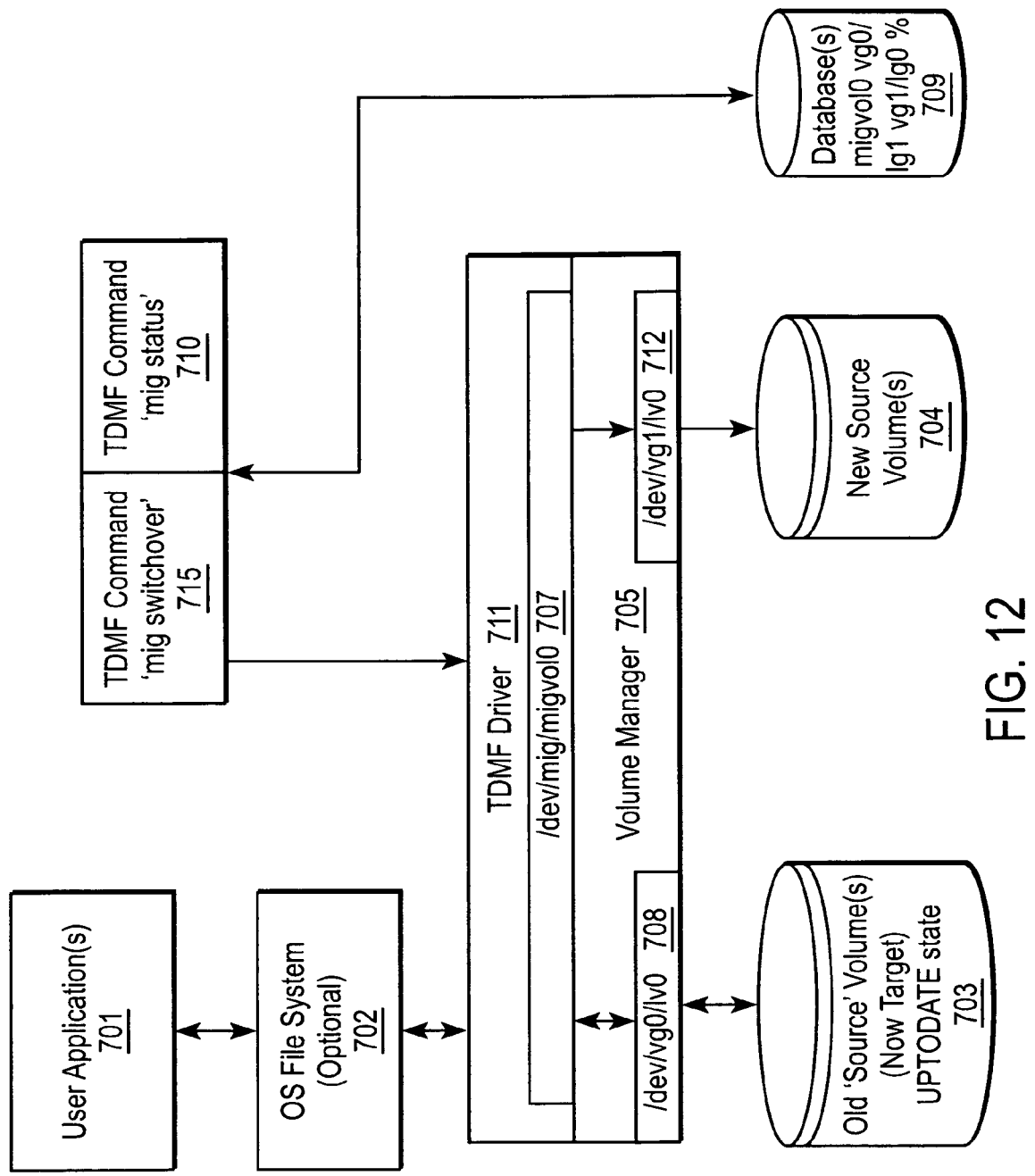

Referring now to FIG. 12, this diagram shows the relationship of the source and target devices 703-704 after the switchover command 715, for example, using one or more techniques set forth above. The source and target devices 703-704 have changed roles (e.g., swap). All application IOs are now satisfied from the new device 704 (e.g., the old target device becoming a new source device) and writes are still going to the old source device 703, which is now designated as a new target device.

Both source and target 704 and 703 are still being kept in synchronized state (e.g., an UPTODATE state) and are therefore eligible for switchover again. If the switchover command 715 were issued for a second time, the situation would revert to the original position of source and target as if the switchover had never been issued. This is useful because if the new device has performance problems, a fall back operation is available simply by re-issuing the switchover.

Figure 13:
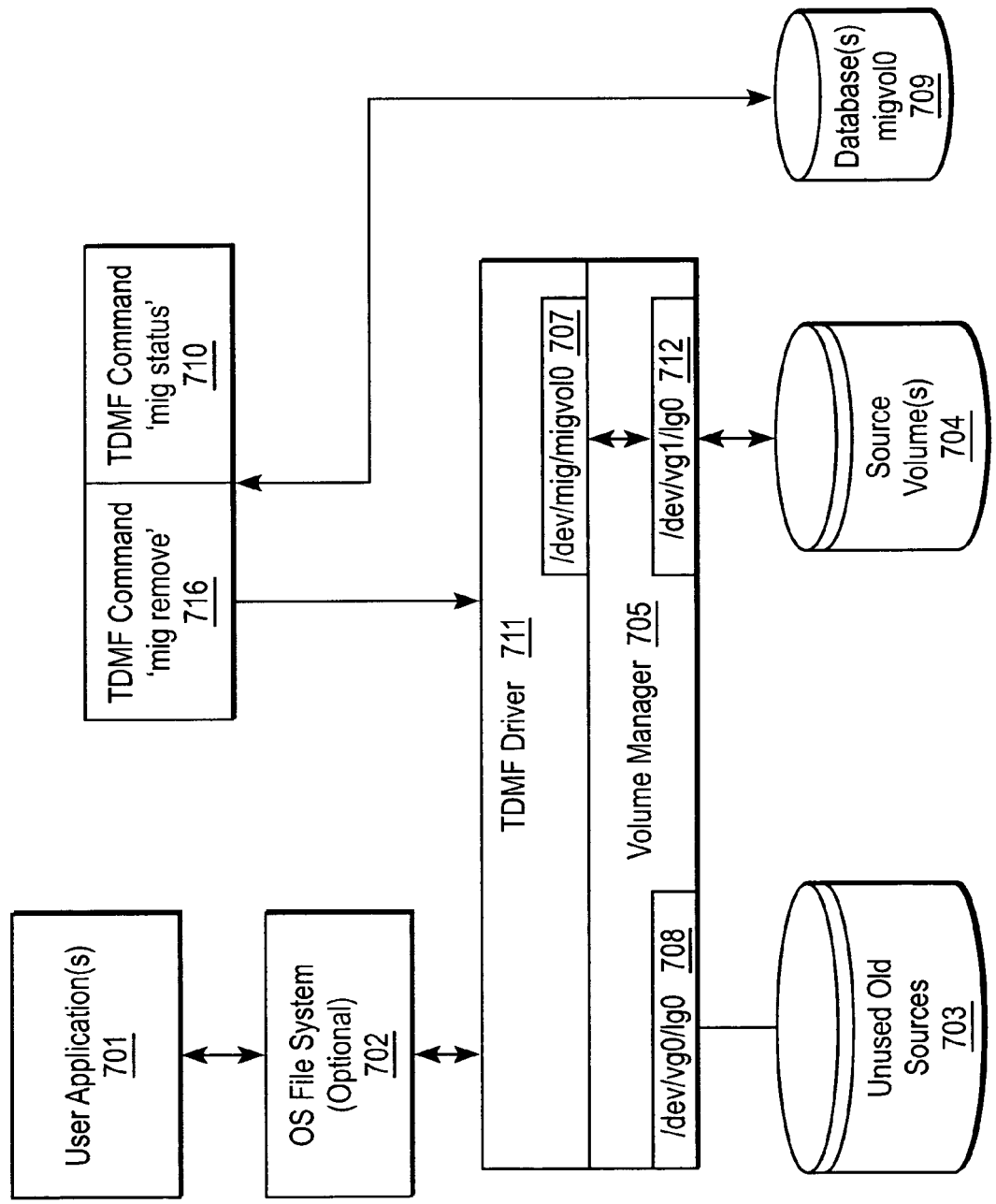

Referring now to FIG. 13, this diagram shows the source and target devices after a migration remove command (e.g., a "mig remove" command) set forth above. In this embodiment, all IOs (e.g., both reads and writes) are going to the new migrated device 707 only. The new source device 704 is now the only source device. The file system is mounted on the migration volume 707 and the system is set up to begin a new migration of this volume to a new target (e.g., newly installed devices) that could be defined with a migration addition command (e.g., a "mig add" command) set forth above. The original source device 703 is now no longer used by the system and may be removed or de-commissioned. There is no future application disruption required for any future migrations. The original devices that held the application production data may now be removed and de-commissioned.

Figure 14:
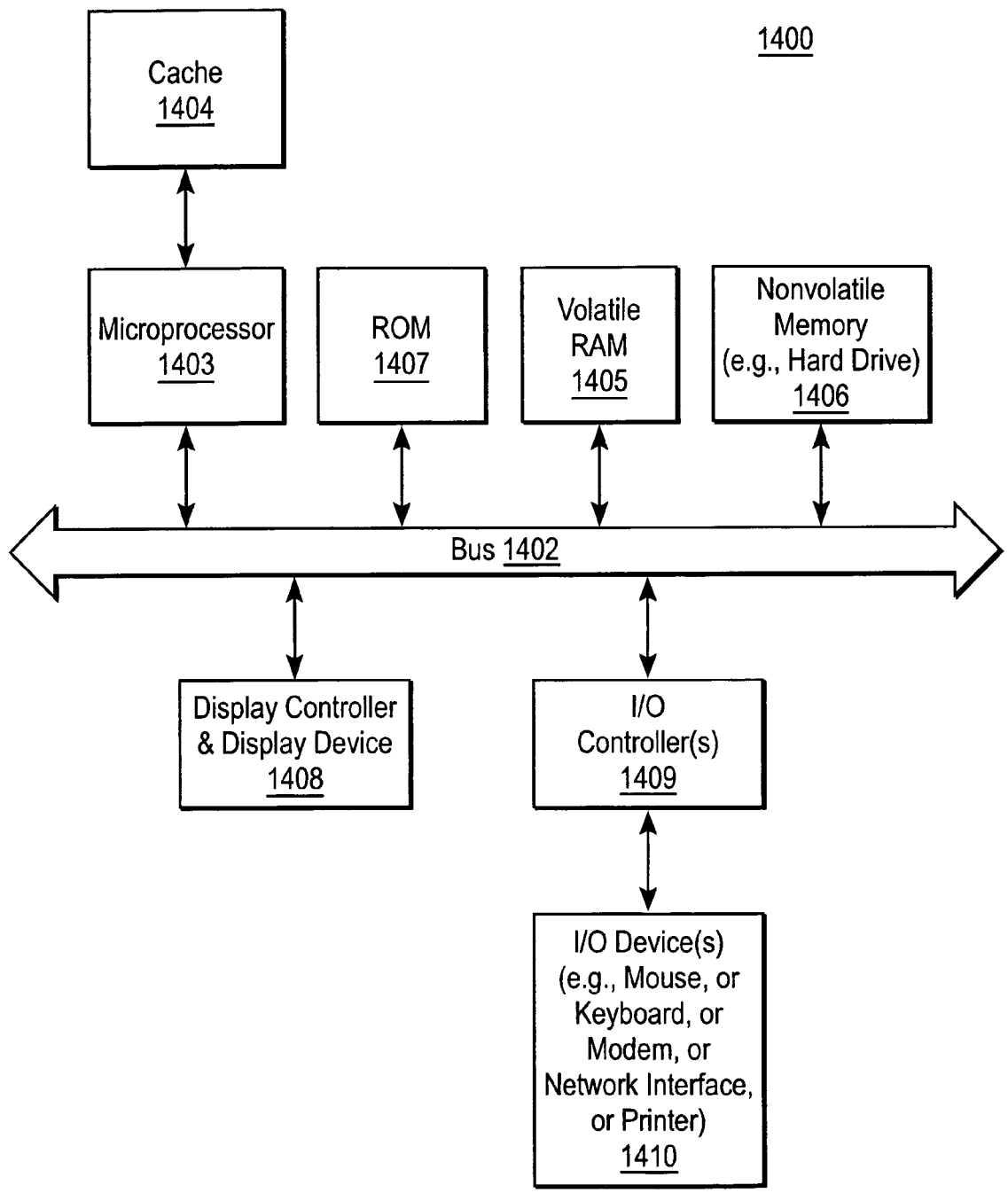
FIG. 14 is a block diagram illustrating a data processing system which may be used with an embodiment of the invention.

FIG. 14 is a block diagram of a digital processing system which may be used with one embodiment of the invention. For example, the system 1400 shown in FIG. 14 may represent a data processing system, such as, any one of the systems 101-103, or a system containing storage volumes 105 and/or 106 of FIG. 1. A data migration program described above may be installed within system 1400 and system 1400 may perform any one of the operations set forth above.

Note that while FIG. 14 illustrates various components of a computer system, it is not intended to represent any particular architecture or manner of interconnecting the components, as such details are not germane to the present invention. It will also be appreciated that network computers, handheld computers, PDAs, personal communicators, cellular phones, and other data processing systems, which have fewer components or more components, may also be used with embodiments of the invention.

As shown in FIG. 14, the computer system 1400, which is a form of a data processing system, includes a bus 1402 which is coupled to a microprocessor 1403 and a ROM 1406, a volatile RAM 1405, and a non-volatile memory 1406. The microprocessor 1403, which may be, for example, an Itanium microprocessor, PA-RISC chip from HP, a SPARC chip from Sun Microsystems or Fujitsu, a PowerPC microprocessor from Motorola, Inc. or IBM, or a Pentium processor from Intel, is coupled to cache memory 1404 as shown in the example of FIG. 14. Processor 1403 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus 1402 interconnects these various components together and also interconnects these components 1403, 1411, 1405, and 1406 to a display controller and display device 1408, as well as to input/output (I/O) devices 1410, which may be mice, keyboards, modems, network interfaces, printers, and other devices which are well-known in the art.

Typically, the input/output devices 1410 are coupled to the system through input/output controllers 1409. The volatile RAM 1405 is typically implemented as dynamic RAM (DRAM) which requires power continuously in order to refresh or maintain the data in the memory. The non-volatile memory 1406 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 14 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1402 may include one or more buses connected to each other through various bridges, controllers, and/or adapters, as is well-known in the art. In one embodiment, the I/O controller 1409 includes a USB (Universal Serial Bus) adapter for controlling USB peripherals. Alternatively, I/O controller 1409 may include an IEEE-1394 adapter, also known as FireWire adapter, for controlling FireWire devices. Other components may also be included.

According to certain embodiments of the invention, the non-volatile memory 1406 may be used to store instructions when executed by processor 1403, cause the processor to perform at least a portion of the operations set forth above. Other configurations may exist.

Thus, method and apparatus for data migration have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:
in response to data received from an application to be written to a first storage volume, writing the data to the first storage volume and a second storage volume substantially concurrently;
copying at least a portion of content of the first storage volume to the second storage volume to synchronize content between the first and second storage volumes according to a copy rate determined at runtime based on a number of storage volumes to which the content of the first storage volume is copied; and
performing a switchover from the first storage volume to the second storage volume when the first and second storage volumes are synchronized, such that subsequent data received from the application is written to the second storage volume, wherein writing the data to the first and second storage volumes and the switchover are performed without knowledge of the application.

2. The method of claim 1, wherein copying content of the first storage volume to the second storage volume is performed independent of writing the data received from the application to the first and second storage volumes.

3. The method of claim 2, wherein at least one of writing the data to the first and second storage volumes and copying content of the first storage volume to the second storage volume is performed in response to a request for migrating data from the first storage volume to the second storage volume.

4. The method of claim 1, wherein the second storage volume is one of a group of storage volumes, and wherein copying the content of first storage volume comprises copying the content of first storage volume to the second storage volume and a third storage volume selected from the group of storage volumes.

5. The method of claim 4, wherein the third storage volume is dynamically attached to the first storage volume without the knowledge of the application.

6. The method of claim 4, wherein copying the content of first storage volume comprises specifying a copying rate represented by an amount of data per a fixed period of time copied from the first storage volume to at least one of the second and third storage volumes.

7. The method of claim 1, further comprising providing a virtual storage volume to represent the first and second storage volumes, wherein the data received from the application is intercepted by the virtual storage volume prior to writing the data to the first and second storage volumes.

8. The method of claim 7, wherein the virtual storage volume is represented by a device driver compatible with an operating system (OS) in which the application is running.

9. The method of claim 1, further comprising maintaining in a database configuration information of the first and second storage volumes, and status information of writing the data to the first and second storage volumes and the switchover.

10. The method of claim 9, further comprising:
detecting an error during at least one of writing the data to the first and second storage volumes and performing switchover; and
in response to the error, restoring configurations of the first and second storage volumes back to original configurations of the first and second storage volumes prior to the at least one of writing the data and performing switchover, using at least one of the configuration information and the status information from the database.

11. A computer implemented method, comprising:
in response to data received from an application to be written to a first storage volume, writing the data to the first storage volume and a second storage volume substantially concurrently; and
performing a switchover from the first storage volume to the second storage volume when the first and second storage volumes are synchronized, such that subsequent data received from the application is written to the second storage volume, wherein writing the data to the first and second storage volumes and the switchover are performed without knowledge of the application, wherein performing the switchover is performed in response to a first request for migrating data from the first storage volume as a source storage volume to the second storage volume as a target storage volume, wherein in response to a second request for migrating data, repeating writing the data and performing switchover using the second storage volume as a source storage volume and the first storage volume as a target storage volume.

12. A computer-implemented method, comprising:
in response to data received from an application to be written to a first storage volume, writing the data to the first storage volume and a second storage volume substantially concurrently;
copying at least a portion of content of the first storage volume to the second storage volume to synchronize content between the first and second storage volumes according to a copy rate represented by an amount of data within a period of time copied from the first storage volume to the second storage volume; and
performing a switchover from the first storage volume to the second storage volume when the first and second storage volumes are synchronized, such that subsequent data received from the application is written to the second storage volume, wherein writing the data to the first and second storage volumes and the switchover are performed without knowledge of the application, wherein performing the switchover is performed in response to a request for migrating data from the first storage volume to the second storage volume, wherein the copying rate is specified within a copy command initiating the copying, wherein the copy command is configured to further indicate that the switchover is performed once the copying is completed.

13. A computer-implemented method, comprising:
providing a virtual storage volume to represent a first storage volume and a second storage volume, wherein data received from an application is intercepted by the virtual storage volume prior to writing the data to the first and second storage volumes;
in response to data received from an application to be written to a first storage volume, the virtual storage volume writing the data to the first storage volume and a second storage volume substantially concurrently, the virtual storage volume encapsulating the first and second storage volumes, such that the application writes the data to the virtual storage volume as if the virtual volume is an actual storage volume without knowing which of the first and second storage volumes to which the data is written; and
performing a switchover from the first storage volume to the second storage volume when the first and second storage volumes are synchronized, such that subsequent data received from the application is written to the second storage volume, wherein writing the data to the first and second storage volumes and the switchover are performed without knowledge of the application.

14. A computer-implemented method, comprising:
providing a virtual storage volume to represent a first storage volume and a second storage volume, wherein the virtual storage volume is associated with a device driver, wherein the device driver is configured to intercept an input/output control (IOCTL) for writing data of an application from a file system of an operating system, and wherein the device driver is configured to redirect the data to the first and second storage volumes without knowledge of at least one of the application and the file system;
in response to data received from an application to be written to a first storage volume, the device driver writing the data to the first storage volume and a second storage volume substantially concurrently; and
performing a switchover from the first storage volume to the second storage volume when the first and second storage volumes are synchronized, such that subsequent data received from the application is written to the second storage volume, wherein writing the data to the first and second storage volumes and the switchover are performed without knowledge of the application.

15. A machine-readable storage medium having executable code to cause a machine to perform a method, the method comprising:
in response to data received from an application to be written to a first storage volume, writing the data to the first storage volume and a second storage volume substantially concurrently;
copying at least a portion of content of the first storage volume to the second storage volume to synchronize content between the first and second storage volumes according to a copy rate determined at runtime based on a number of storage volumes to which the content of the first storage volume is copied; and
performing a switchover from the first storage volume to the second storage volume when the first and second storage volumes are synchronized, such that subsequent data received from the application is written to the second storage volume, wherein writing the data to the first and second storage volumes and the switchover are performed without knowledge of the application.

16. A system, comprising:
a processor;
a memory coupled to the processor for storing instructions, when executed from the memory, cause the processor to in response to data received from an application to be written to a first storage volume, write the data to the first storage volume and a second storage volume substantially concurrently, copy at least a portion of content of the first storage volume to the second storage volume to synchronize content between the first and second storage volumes according to a copy rate determined at runtime based on a number of storage volumes to which the content of the first storage volume is copied, and perform a switchover from the first storage volume to the second storage volume when the first and second storage volumes are synchronized, such that subsequent data received from the application is written to the second storage volume, wherein writing the data to the first and second storage volumes and the switchover are performed without knowledge of the application.

17. An apparatus for data migration, comprising:

an input/output (I/O) interface logic to be coupled to a first storage device and a second storage device;

a command module, in response to a request for data migration, to issue one or more commands to perform the data migration;

a copy module, in response to a copy command received from the command module, to copy, via the I/O interface logic, at least a portion of content of a source storage volume of the first storage device to a target storage volume of the second storage device to synchronize content between the source and target storage volume according to a copy rate determined at runtime based on a number of storage volumes to which the content of the first storage volume is copied; and a driver module to receive the one or more commands from the command module, wherein in response to data received from an application to be written to the source storage volume and without knowledge of the application, the driver module is configured to write the data, via the I/O interface logic, to the source and target storage volumes and to perform a switchover once the source and target storage volumes are synchronized, such that subsequent data received from the application is written to the target storage volume.

18. The apparatus of claim 17, wherein the at least a portion of the content of the source storage volume is copied to the target storage volume according to a copying rate specified within the copy command.

19. The apparatus of claim 18, wherein the copy command further indicates that the switchover is performed once the at least a portion of the content of the source storage volume has been copied to the target storage volume.

20. The apparatus of claim 17, wherein the driver module is associated with a virtual storage volume to encapsulate the source and target storage volumes.

21. The apparatus of claim 20, wherein the virtual storage volume intercepts an input/output control (IOCTL) to write the data of the application from a file system of an operating system (OS) in which the application is running without the knowledge of the file system, and wherein the virtual storage volume redirects the IOCTL to the source and target storage volumes.

22. The apparatus of claim 17, further comprising a database to store configuration information of the source and target storage volume and status information of one or more transactions involved in the source and target storage volumes.

23. The apparatus of claim 22, wherein in response to an error detected in at least one of the source and target storage volumes, the driver module restores configurations of the source and target storage volumes back to original configurations of the source and target storage volume prior to the switchover, using at least one of the configuration and status information stored in the database.

24. A computer implemented method, comprising:

receiving at a device driver a request for migrating data from a source storage volume to a target storage volume; and copying at least a portion of content of the source volume to the target storage volume according to a copying schedule without knowledge of an application accessing the device driver, the copying schedule including an amount of data to be copied per fixed period of time, wherein the copying schedule is specified in a copy command in response to the request for migrating data.

25. The method of claim 24, further comprising specifying within the copy command to force copy all content of the source storage volume to the target storage volume.

26. The method of claim 24, further comprising specifying within the copy command to indicate a number of substantially concurrent threads to be used to perform the copying.

27. The method of claim 24, further comprising specifying within the copy command to indicate to perform a switchover between the source and target storage volumes upon a completion of the copying, such that subsequent data received from the application is directed to the target storage volume.

28. The method of claim 24, further comprising creating a virtual storage volume represented by the device driver to encapsulate the source and target storage volumes.

29. A computer implemented method for migrating data, the method comprising:

in response to a request for migrating data from a first storage volume accessed by an application via a file system of an operating system (OS), creating a virtual storage volume to represent the first storage volume;

unmounting the file system from the first storage volume and remounting the file system to the virtual storage volume;

associating the first storage volume and a second storage volume to the virtual storage volume, the virtual storage volume encapsulating the first and second storage volumes;

in response to data received from the application, the virtual storage volume directing the data to the first and second storage volumes substantially concurrently;

optionally issuing a copy command to copy at least a portion of content of the first storage volume to the second storage volume to synchronize the first and second storage volumes, the copy command specifying a copying rate, wherein the at least a portion of content of the first storage volume is copied according to the copying rate; and performing a switchover from the first storage volume to the second storage volume when the first and second storage volumes are synchronized, such that subsequent data received from the application is direct to the second storage volume, wherein at least one of directing the data of the application to the first and second storage volumes, issuing the copy command, and performing the switchover is performed without knowledge of at least one of the application and the file system.

* * * * *